United States Patent
Shirokawa et al.

(10) Patent No.: US 11,525,782 B2
(45) Date of Patent: Dec. 13, 2022

(54) FLUORESCENT IMAGE ANALYZER

(71) Applicant: Tianma Japan, Ltd., Kanagawa (JP)

(72) Inventors: Masanori Shirokawa, Kanagawa (JP); Ken Sumiyoshi, Kanagawa (JP)

(73) Assignee: TIANMA JAPAN, LTD., Kanagawa (JP)

( * ) Notice: Subject to any disclaimer, the term of this patent is extended or adjusted under 35 U.S.C. 154(b) by 109 days.

(21) Appl. No.: 17/008,910

(22) Filed: Sep. 1, 2020

(65) Prior Publication Data
US 2021/0063310 A1     Mar. 4, 2021

(30) Foreign Application Priority Data

Sep. 3, 2019    (JP) .............................. JP2019-160627
Mar. 25, 2020   (JP) .............................. JP2020-055140

(51) Int. Cl.
  *G01N 21/64*    (2006.01)
(52) U.S. Cl.
  CPC ..... *G01N 21/6445* (2013.01); *G01N 21/6456* (2013.01); *G01N 2201/0683* (2013.01)
(58) Field of Classification Search
  CPC .......... G01N 21/6445; G01N 21/6456; G01N 2201/0683; G01N 21/64; G01N 21/6428; G01N 21/21; G01N 21/6458; G01J 4/00; G01J 3/0224; G02F 2203/07; G02B 21/0076; G02B 5/3025; G02B 21/0092; G02B 27/286; G02B 21/0068; G02B 27/283

See application file for complete search history.

(56) References Cited

U.S. PATENT DOCUMENTS

| | | | | |
|---|---|---|---|---|
| 5,495,850 A | * | 3/1996 | Zuckerman | ........ A61B 5/14555 600/323 |
| 6,052,187 A | * | 4/2000 | Krishnan | ............. A01C 21/007 356/369 |
| 7,522,278 B2 | * | 4/2009 | Kaminsky | ............ G02B 21/361 356/364 |

(Continued)

FOREIGN PATENT DOCUMENTS

WO    WO-2021130222 A1 *  7/2021  ............. G02B 21/00

*Primary Examiner* — Mohamed K Amara
(74) *Attorney, Agent, or Firm* — Sughrue Mion, PLLC

(57) ABSTRACT

A fluorescent image analyzer stores a reference fluorescent-sample image and a subject fluorescent-sample image. The reference fluorescent-sample image is an image obtained by illuminating a reference fluorescent sample about which relation of in-plane fluorescence intensities is known with linearly polarized light and capturing a first specific polarization component of fluorescence from the reference fluorescent sample. The subject fluorescent-sample image is an image obtained by illuminating a subject fluorescent sample with linearly polarized light and capturing a second specific polarization component of fluorescence from the subject fluorescent sample. The fluorescent image analyzer is configured to determine correction coefficients to correct non-uniformity in measurement of light intensities among pixels of a captured image based on the reference fluorescent-sample image, and correct light intensities of the pixels of the subject fluorescent-sample image based on the correction coefficients.

20 Claims, 26 Drawing Sheets

(56) References Cited

U.S. PATENT DOCUMENTS

| | | | |
|---|---|---|---|
| 7,609,391 B2* | 10/2009 | Betzig | G02B 21/0056 356/521 |
| 8,487,271 B2* | 7/2013 | Yokoi | G01N 21/65 356/951 |
| 10,408,740 B2* | 9/2019 | Raveh | G01N 21/23 |
| 10,620,116 B2* | 4/2020 | Kojima | G01N 21/21 |
| 2002/0009711 A1* | 1/2002 | Wada | G01N 21/6445 435/6.11 |
| 2005/0041249 A1* | 2/2005 | Dobbs | G01J 3/447 356/364 |
| 2005/0264813 A1* | 12/2005 | Giakos | G01J 4/04 356/369 |
| 2007/0154938 A1* | 7/2007 | Oshida | G01N 21/6452 356/320 |
| 2010/0245551 A1* | 9/2010 | Morita | A61B 1/051 348/E7.085 |
| 2011/0194175 A1* | 8/2011 | Dougherty | G02B 27/145 359/386 |
| 2011/0234978 A1* | 9/2011 | Hammer | A61B 3/1015 351/208 |
| 2012/0321759 A1* | 12/2012 | Marinkovich | A61B 5/442 356/402 |
| 2015/0050650 A1* | 2/2015 | Seppo | G06T 7/0012 435/7.1 |
| 2015/0104860 A1* | 4/2015 | Cunningham | G01J 3/4406 435/287.2 |
| 2015/0256733 A1* | 9/2015 | Kanamori | G01N 21/21 348/234 |
| 2015/0362713 A1* | 12/2015 | Betzig | G02B 21/0064 250/459.1 |
| 2016/0370290 A1* | 12/2016 | Raphael | G01N 21/554 |
| 2017/0074796 A1 | 3/2017 | Hibara et al. | |
| 2017/0242398 A1* | 8/2017 | Brooker | A61B 3/13 |
| 2019/0162662 A1* | 5/2019 | Raphael | G01N 21/648 |
| 2020/0173911 A1* | 6/2020 | Kojima | G01J 3/0224 |
| 2021/0148824 A1* | 5/2021 | Lee | G01N 21/6428 |
| 2021/0372927 A1* | 12/2021 | Gopinath | A61B 1/0607 |

\* cited by examiner

MEAN VALUES OF UNCORRECTED AND CORRECTED LIGHT INTENSITIES MEASURED
FROM SUBJECT SAMPLE IN FIVE CHANNELS (DIRECTION OF POLARIZATION CAMERA: 0°)

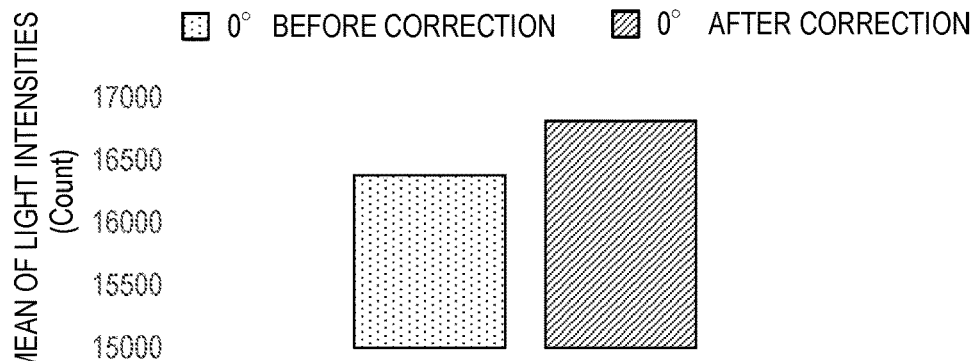

FIG. 32

STANDARD DEVIATIONS OF UNCORRECTED AND CORRECTED LIGHT INTENSITIES
MEASURED FROM SUBJECT SAMPLE IN FIVE CHANNELS
(DIRECTION OF POLARIZATION CAMERA: 0°)

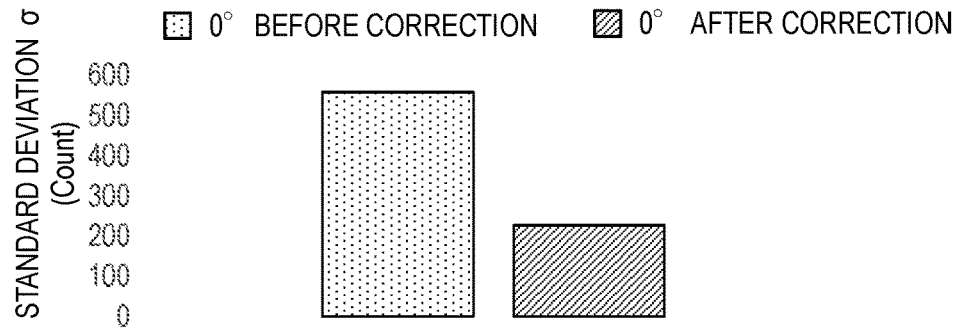

FIG. 33

STANDARD DEVIATION/MEAN VALUE OF UNCORRECTED AND CORRECTED LIGHT INTENSITIES
MEASURED FROM SUBJECT SAMPLE IN FIVE CHANNELS
(DIRECTION OF POLARIZATION CAMERA: 0°)

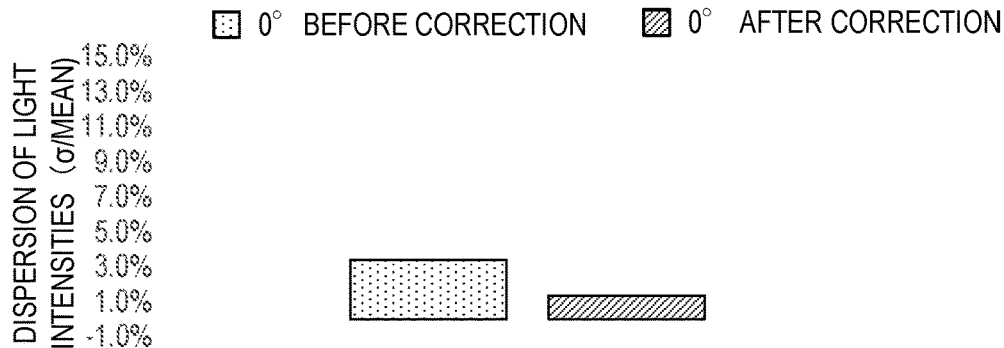

FIG. 34

FLUORESCENT IMAGE ANALYZER

CROSS-REFERENCE TO RELATED APPLICATIONS

This non-provisional application claims priority under 35 U.S.C. § 119(a) on Patent Application No. 2019-160627 filed in Japan on Sep. 3, 2019 and Patent Application No. 2020-55140 filed in Japan on Mar. 25, 2020, the entire contents of which are hereby incorporated by reference.

BACKGROUND

This disclosure relates to a fluorescent image analyzer.

Fluorescent image analysis is widely used to assess various states of various molecules. A fluorescent image is obtained by illuminating a fluorescently labeled sample with polarized light as excitation light and extracting a specific polarization component from the fluorescence. For example, a fluorescence depolarization method calculates a fluorescence polarization value from the polarization components of the fluorescence that are parallel and perpendicular to the polarization direction of the excitation light to analyze a sample. The fluorescence polarization value (fluorescence anisotropy) teaches information on molecules, such as the size, the shape, the concentration, and the viscosity.

SUMMARY

An aspect of this disclosure is a fluorescent image analyzer including one or more processors and one or more storage devices. The one or more storage devices store a reference fluorescent-sample image and a subject fluorescent-sample image. The reference fluorescent-sample image is an image obtained by illuminating a reference fluorescent sample about which relation of in-plane fluorescence intensities is known with linearly polarized light and capturing a first predetermined polarization component of fluorescence from the reference fluorescent sample. The subject fluorescent-sample image is an image obtained by illuminating a subject fluorescent sample with linearly polarized light and capturing a second predetermined polarization component of fluorescence from the subject fluorescent sample. The one or more processors are configured to determine correction coefficients to correct non-uniformity in measurement of light intensities among pixels of a captured image based on the reference fluorescent-sample image, and correct light intensities of the pixels of the subject fluorescent-sample image based on the correction coefficients.

It is to be understood that both the foregoing general description and the following detailed description are exemplary and explanatory and are not restrictive of this disclosure.

BRIEF DESCRIPTION OF THE DRAWINGS

FIG. 32 provides mean values of uncorrected and corrected light intensities measured by a polarization camera from a subject fluorescent sample filled in five channels of a microchannel cell in Embodiment 3;

FIG. 33 provides standard deviations ($\sigma$) of the uncorrected and corrected light intensities measured by the polarization camera from the subject fluorescent sample filled in the five channels of the microchannel cell in Embodiment 3;

FIG. 34 provides dispersion ($\sigma$/MEAN) of the uncorrected and corrected light intensities measured by the polarization camera from the subject fluorescent sample filled in the five channels of the microchannel cell in Embodiment 3;

EMBODIMENTS

Hereinafter, embodiments of this disclosure will be described with reference to the accompanying drawings. It should be noted that the embodiments are merely examples to implement this disclosure and are not to limit the technical scope of this disclosure.

The fluorescent image analyzer disclosed herein makes correction to the in-plane light intensity distribution in a fluorescent image. The fluorescent image is taken by a fluorescence polarization measurement device. The fluorescence polarization measurement device may include some factors to alter the fluorescent image.

For example, when the fluorescence polarization measurement device includes a dichroic mirror, the dichroic mirror may bias the in-plane light intensity in the fluorescent image. That is to say, a fluorescent image of a sample having uniform in-plane light intensity may exhibit light intensity biased in the plane. Another example of a factor is light intensity distribution of excitation light. When the light intensity distribution of excitation light is not uniform, the in-plane light intensity of the fluorescent image may be altered. That is to say, a fluorescent image of a sample having uniform in-plane light intensity may exhibit non-uniform light intensity in the plane.

The fluorescent image analyzer disclosed herein determines correction values to the non-uniformly measured light intensities of the pixels of a captured image based on a reference fluorescent-sample image and corrects the light intensity values of the pixels in a subject fluorescent-sample image. As a result, the light intensity values in a subject fluorescent-sample image altered by instrumental causes can be appropriately corrected.

Embodiment 1

Device Configuration

Figure 1:
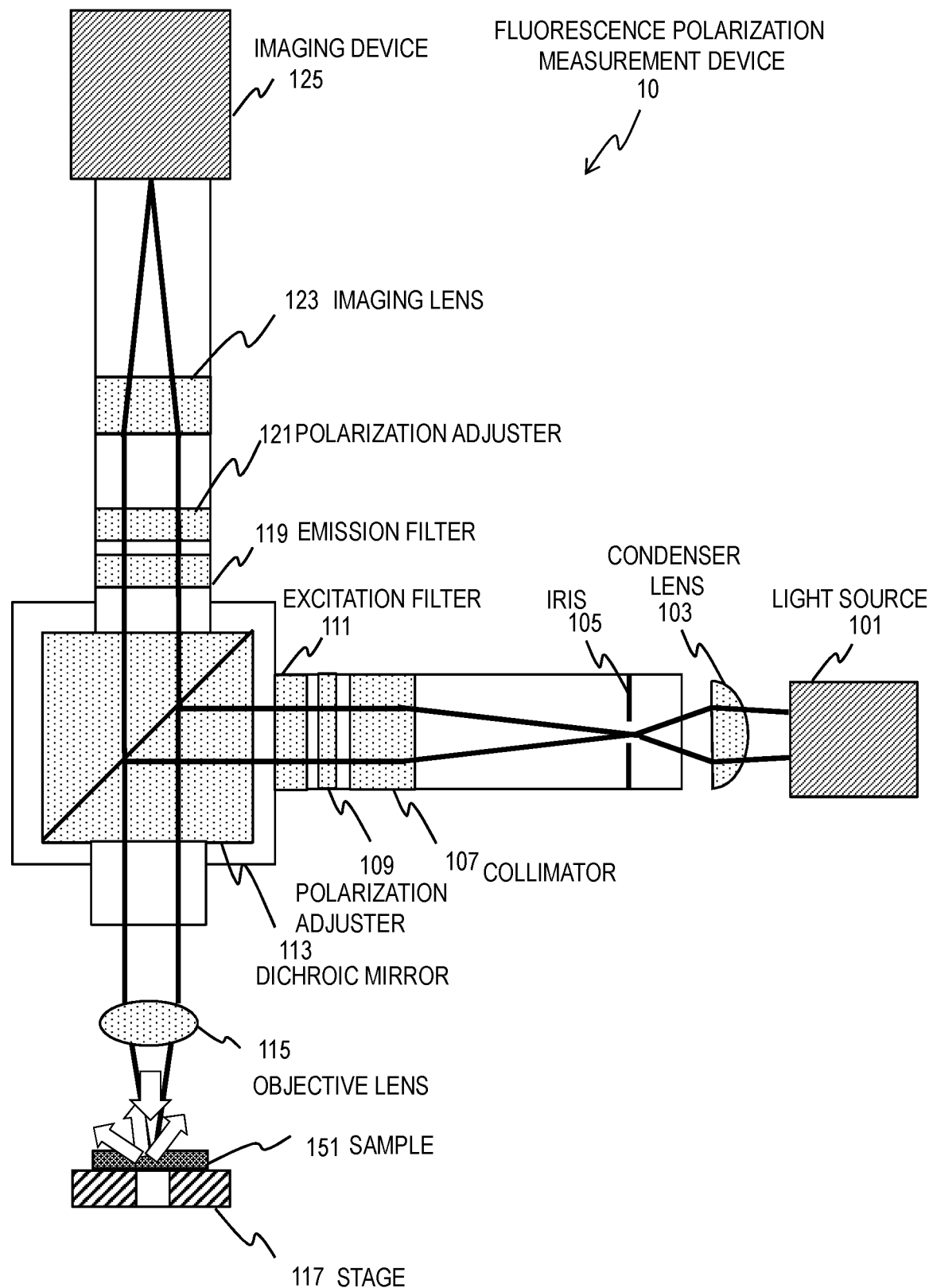
FIG. 1 schematically illustrates a configuration example of a fluorescence polarization measurement device included in a fluorescence polarization measurement system in Embodiment 1 and Embodiment 2.

FIG. 1 schematically illustrates a configuration example of a fluorescence polarization measurement device included in a fluorescence polarization measurement system. As will be described later, the fluorescence polarization measurement system includes a fluorescence polarization measurement device and a fluorescence polarization measurement controller for controlling the fluorescence polarization measurement device and analyzing the fluorescent image taken by the fluorescence polarization measurement device.

In the configuration example illustrated in FIG. 1, the fluorescence polarization measurement device 10 includes a light source 101, a condenser lens 103, an iris 105, a collimator 107, a polarization adjuster 109, an excitation filter 111, and a dichroic mirror 113. The fluorescence polarization measurement device 10 further includes an objective lens 115, a stage 117, an emission filter 119, a polarization adjuster 121, an imaging lens 123, and an imaging device 125.

A sample 151 is placed on the stage 117. The light source 101 can be an LED; it outputs excitation light of a wavelength (such as blue light having a central wavelength of 470 nm) to excite fluorescence in the sample 151. The excitation light from the light source 101 is collected by the condenser lens 103 and passes through the iris 105. The iris 105 reduces the external light.

The excitation light that has passed through the iris 105 is transformed to parallel light by the collimator 107 and enters the polarization adjuster 109. The polarization adjuster 109 can be a polarizing plate, a polarizing beam splitter, or a liquid crystal cell. In the example described in the following, the polarization adjuster 109 is a polarizing plate. The polarization adjuster 109 transmits light polarized linearly in a specific direction. The linearly polarized excitation light from the polarization adjuster 109 passes through the excitation filter 111 and is reflected by the dichroic mirror 113 toward the objective lens 115. The excitation filter 111 is to select a wavelength range including the wavelength of the excitation light and reduces the light different from the excitation light from the polarization adjuster 109.

The objective lens 115 focuses the linearly polarized excitation light reflected by the dichroic mirror 113 on the sample 151 on the stage 117. The sample 151 emits fluorescence having a specific wavelength (such as green light) in response to the linearly polarized excitation light from the objective lens 115. The fluorescence is transformed into parallel light by the objective lens 115 and passes through the dichroic mirror 113 and the emission filter 119. The dichroic mirror 113 selectively transmits light within a predetermined wavelength range including the fluorescence from the sample 151 and reflects the other light. The emission filter 119 is to select a wavelength range including the wavelength of the fluorescence from the sample 151 and reduces the light other than the fluorescence.

The fluorescence that has passed through the emission filter 119 enters the polarization adjuster 121. The polarization adjuster 121 can be a polarizing plate, a polarizing beam splitter, or a liquid crystal cell. The polarization adjuster can also be a polarizing filter in a polarization camera. The polarization camera is an imaging device including a polarizing filter on the sensor to acquire polarization information of a subject. The polarization adjuster 121 in the example described in the following is a liquid crystal cell to be controlled by applied voltage. The polarization adjuster 121 transmits only a specific linear polarization component of the fluorescence. Specifically, the polarization adjuster 121 transmits light polarized linearly in the direction parallel or perpendicular to the polarization direction of the excitation light.

The linearly polarized fluorescence that has passed through the polarization adjuster 121 is imaged by the imaging lens 123 on the imaging plane of the imaging device 125. Examples of the imaging device 125 include a CMOS image sensor. The imaging device 125 has a plurality of pixels to generate image data in accordance with the light intensity of the fluorescence and sends the generated data to the fluorescence polarization measurement controller (not shown in FIG. 1).

The fluorescence polarization measurement device 10 can have a configuration different from the configuration illustrated in FIG. 1. For example, the fluorescence polarization measurement device 10 can exclude the dichroic mirror 113 by obliquely illuminating the sample with excitation light. The iris 105, the excitation filter 111, and the emission filter 119 are optional. The fluorescence polarization measurement device 10 can include one or more lenses in addition to or in place of the lenses in FIG. 1.

Figure 2:
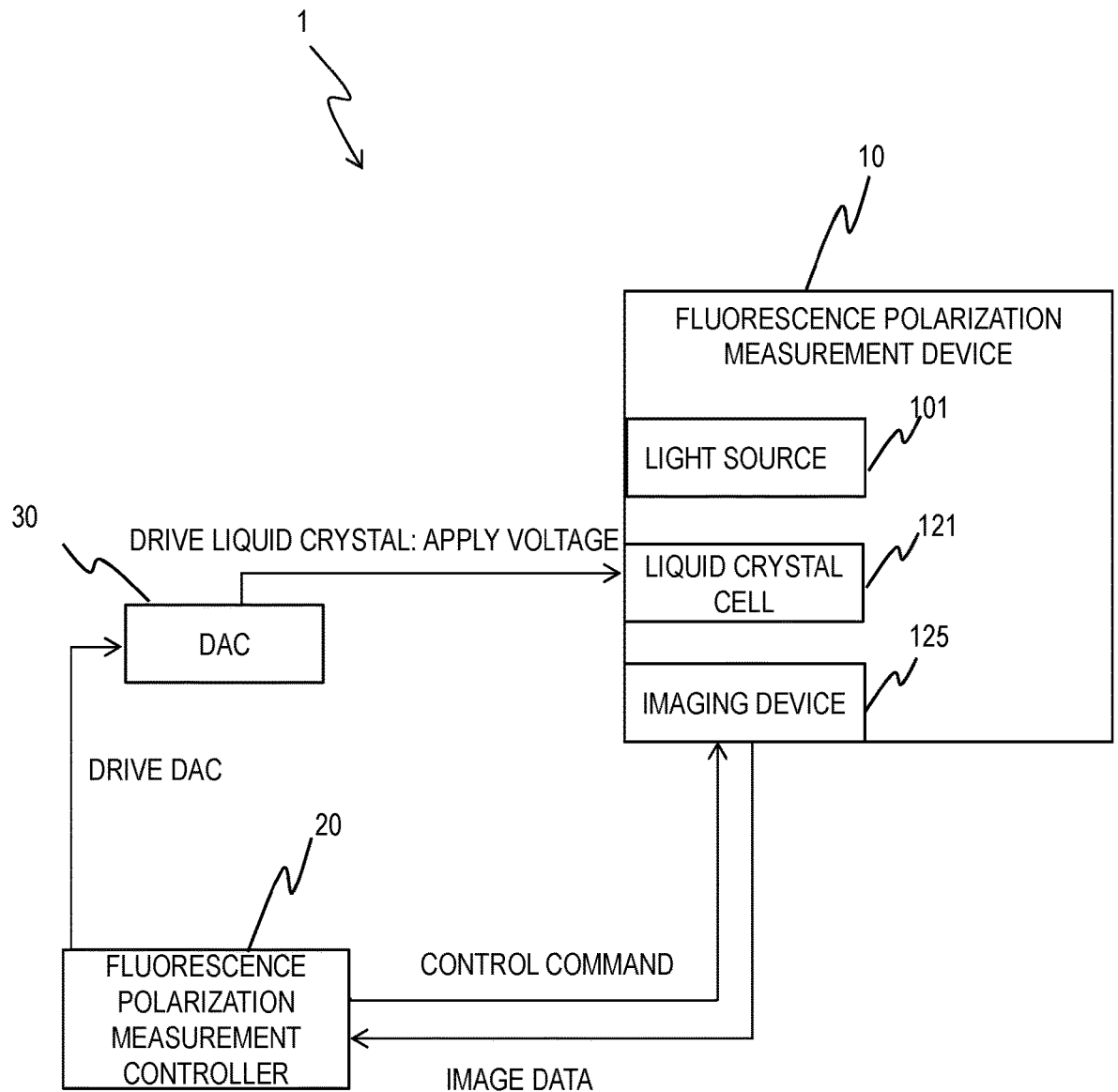
FIG. 2 schematically illustrates an example of a logical configuration of a fluorescence polarization measurement system.

FIG. 2 schematically illustrates an example of a logical configuration of a fluorescence polarization measurement system. The fluorescence polarization measurement system 1 includes a fluorescence polarization measurement device 10, a fluorescence polarization measurement controller 20, and a D/A converter (DAC) 30. The fluorescence polarization measurement device 10 is configured as described with reference to FIG. 1. The fluorescence polarization measurement controller 20 controls the fluorescence polarization measurement device 10 and analyzes the fluorescent image taken by the fluorescence polarization measurement device 10. Specifically, the fluorescence polarization measurement controller 20 controls the light source 101, the liquid crystal cell (polarization adjuster) 121, and the imaging device 125 of the fluorescence polarization measurement device 10.

For example, the fluorescence polarization measurement controller 20 keeps the light source 101 ON to illuminate the sample with excitation light during the measurement. The fluorescence polarization measurement controller 20 controls the voltage to be applied to the liquid crystal cell 121 with the D/A converter 30. The polarization component of fluorescence to be transmitted through the liquid crystal cell 121 can be controlled by controlling the voltage applied to the liquid crystal cell 121.

The liquid crystal cell 121 includes two transparent substrates opposed to each other, transparent electrodes provided on the opposed faces of the substrates, liquid crystal material encapsulated between the substrates, and a polarizing plate provided on the outer face on the imaging device side (emission side or downstream side). The liquid crystal cell 121 can be configured desirably as far as the liquid crystal cell 121 can adjust the transmittable polarization component of fluorescence.

In addition to the voltage to be applied to the liquid crystal cell 121, the fluorescence polarization measurement controller 20 controls the exposure time (imaging time), or the start time and the duration of imaging, of the imaging device 125 to acquire image data of the desired polarization component of the fluorescence. The fluorescence polarization measurement controller 20 further analyzes the acquired image data. As will be described later, the fluorescence polarization measurement controller 20 corrects the values measured from the sample to be analyzed (subject sample) based on the image of a reference sample. This operation corrects the image altered by the device configuration of the fluorescence polarization measurement device 10 to achieve more accurate measurement.

Figure 3:
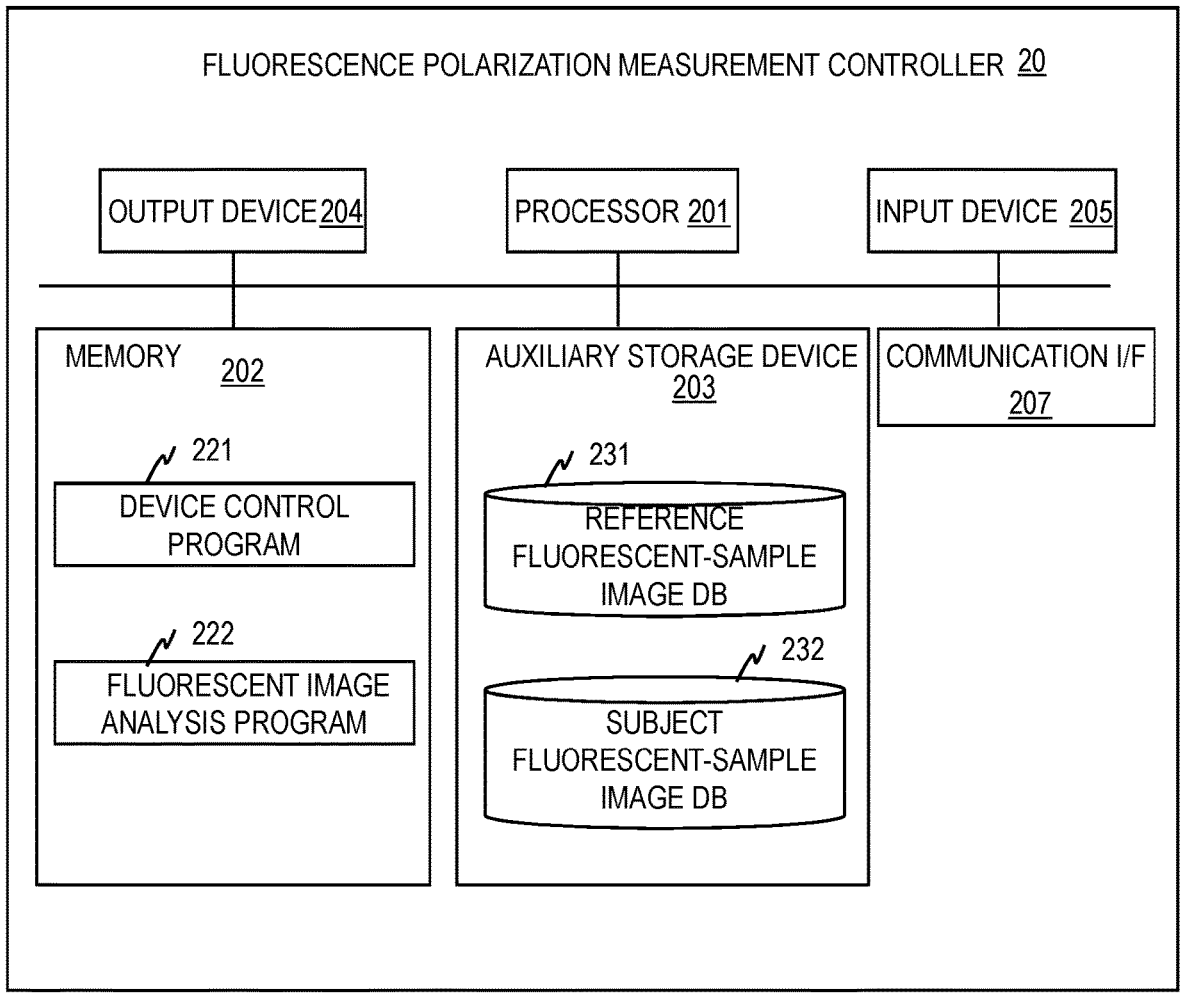
FIG. 3 schematically illustrates a configuration example of a fluorescence polarization measurement controller.

FIG. 3 schematically illustrates a configuration example of a fluorescence polarization measurement controller 20. The fluorescence polarization measurement controller 20 can be configured with a computer. The fluorescence polarization measurement controller 20 in the example in FIG. 3 includes a processor 201, a memory (primary storage device) 202, an auxiliary storage device 203, an output device 204, an input device 205, and a communication interface (I/F) 207. These components are interconnected by a bus. The memory 202, the auxiliary storage device 203, or the combination of these is a storage device and stores programs and data to be used by the processor 201.

The memory 202 can be a semiconductor memory and is mainly used to store programs being executed and data. The processor 201 performs a variety of processing in accordance with the programs stored in the memory 202. The memory 202 in the configuration example in FIG. 3 holds a device control program 221 and a fluorescent image analysis program 222, in addition to a not-shown operating system.

The processor 201 operates in accordance with the programs to implement various function units. For example, the processor 201 operates in accordance with the device control program 221 to work as a device control unit and operates in accordance with the fluorescent image analysis program 222 to work as a fluorescent image analysis unit.

The auxiliary storage device 203 can be a large-capacity storage device such as a hard disk drive or a solid-state drive; it is used to hold programs and data on a long-term basis. The auxiliary storage device 203 in the configuration example in FIG. 3 holds a reference fluorescent-sample image database (DB) 231 and a subject fluorescent-sample image database 232. The subject fluorescent-sample image database 232 stores images acquired from the subject fluorescent samples. The reference fluorescent-sample image database 231 stores reference fluorescent-sample images for correcting the light intensity-based values of the subject fluorescent-sample images.

The processor 201 can be one or more processing units and include one or more computing units or a plurality of processing cores. The processor 201 can be implemented as one or more central processing units, microprocessors, microcomputers, microcontrollers, digital signal processors, state machines, logic circuits, graphic processing units, chip-on systems, and/or any device that operates a signal in accordance with control instructions.

The programs and data stored in the auxiliary storage device 203 are loaded to the memory 202 at the start-up or when needed and the programs are executed by the processor 201 to perform a variety of processing of the fluorescence polarization measurement controller 20. Accordingly, the processing performed by a program described in the following is processing performed by the processor 201 or the fluorescence polarization measurement controller 20.

The input device 205 is a hardware device for the user to input instructions and information to the fluorescence polarization measurement controller 20. The output device 204 is a hardware device for presenting images for input and output, such as a display device or a printing device. The communication I/F 207 is an interface for connecting to a network. The input device 205 and the output device 204 are optional and the fluorescence polarization measurement controller 20 can be accessed by a terminal via the network.

The functions of the fluorescence polarization measurement controller 20 can be implemented in a computer system that includes one or more computers including one or more processors and one or more storage devices including a non-transitory storage medium. Computers communicate with one another via a network. For example, a part of the functions of the fluorescence polarization measurement controller 20 can be implemented in one computer and another part can be implemented in another computer.

Operation

Hereinafter, operation of the fluorescence polarization measurement controller 20 is described. The device control program 221 controls the light source 101, the liquid crystal cell (polarization adjuster) 121, and the imaging device 125 of the fluorescence polarization measurement device 10 as described with reference to FIG. 2. In the example described in the following, the liquid crystal cell 121 is switched between ON and OFF. In an OFF state, the liquid crystal cell 121 transmits only the linear polarization component that is parallel to the linearly polarized light incident on the sample. In an ON state, the liquid crystal cell 121 transmits only the linear polarization component that is perpendicular to the linearly polarized light incident on the sample. The liquid crystal cell 121 in an ON state rotates the linearly polarized light by 90°. The conditions of the liquid crystal cell 121 in the ON/OFF states can be opposite, compared to this example.

Figure 4:
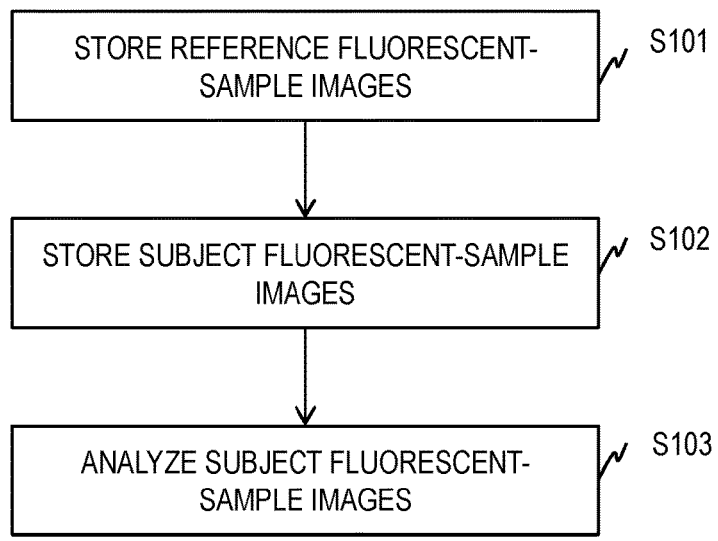
FIG. 4 is a flowchart of an example of operation of a fluorescence polarization measurement controller.

FIG. 4 is a flowchart of an example of operation of the fluorescence polarization measurement controller 20. The device control program 221 acquires reference fluorescent-sample images from the fluorescence polarization measurement device 10 and stores them to the reference fluorescent-sample image database 231 (S101). In the example described in the following, the device control program 221 acquires a reference fluorescent-sample image obtained by capturing the linear polarization component parallel to the linear polarization direction of the excitation light and another reference fluorescent-sample image obtained by capturing the linear polarization component perpendicular to the linear polarization direction of the excitation light.

Next, the device control program 221 acquires subject fluorescent-sample images from the fluorescence polarization measurement device 10 and stores them to the subject fluorescent-sample image database 232 (S102). In the example described in the following, the device control program 221 acquires a subject fluorescent-sample image obtained by capturing the linear polarization component parallel to the linear polarization direction of the excitation light and another subject fluorescent-sample image obtained by capturing the linear polarization component perpendicular to the linear polarization direction of the excitation light.

Next, the fluorescent image analysis program 222 analyzes the subject fluorescent-sample images based on the reference fluorescent-sample images (S103). In the example described in the following, the fluorescent image analysis program 222 corrects the subject fluorescent-sample images based on the reference fluorescent-sample images before calculating the fluorescence polarization value of the subject fluorescent sample.

Figure 5:
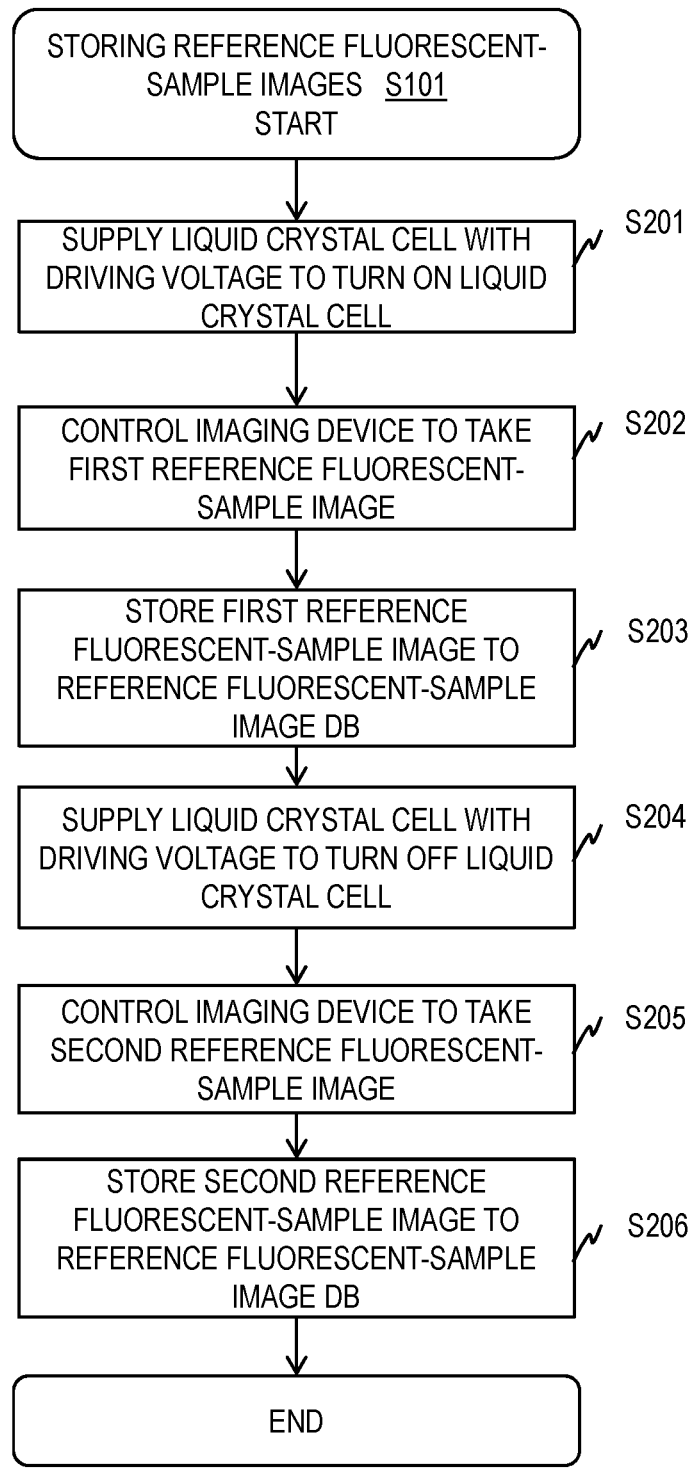
FIG. 5 is a flowchart of an example of the details of the step of storing reference fluorescent-sample images.

FIG. 5 is a flowchart of an example of the details of the step S101 of storing reference fluorescent-sample images. The reference fluorescent sample is placed on the stage 117 by the operator. The device control program 221 supplies the liquid crystal cell 121 with a driving voltage to turn ON the liquid crystal cell 121 (S201).

The device control program 221 makes the imaging device 125 receive light for a predetermined exposure period to take a first reference fluorescent-sample image (S202). The first reference fluorescent-sample image is an image of the linear polarization component of the fluorescence that is perpendicular to the polarization direction of the excitation light. The device control program 221 acquires the first reference fluorescent-sample image from the imaging device 125 and stores it to the reference fluorescent-sample image database 231 (S203).

Next, the device control program 221 supplies the liquid crystal cell 121 with a driving voltage to turn OFF the liquid crystal cell 121 (S204). The device control program 221 makes the imaging device 125 receive light for a predetermined exposure period to take a second reference fluorescent-sample image (S205). The second reference fluorescent-sample image is an image of the linear polarization component of the fluorescence that is parallel to the polarization direction of the excitation light. The device control program 221 acquires the second reference fluorescent-sample image from the imaging device 125 and stores it to the reference fluorescent-sample image database 231 (S206).

Figure 6:
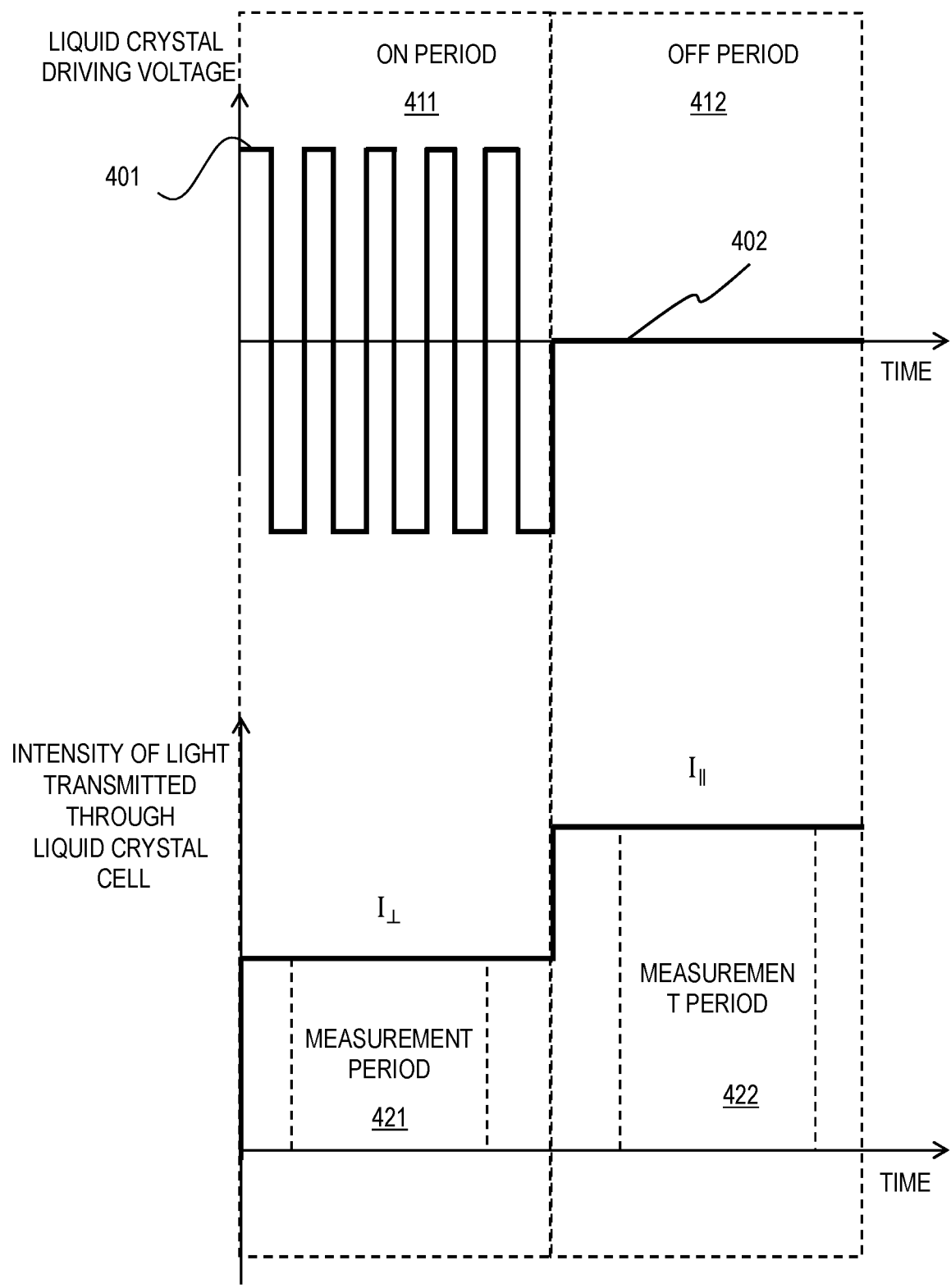
FIG. 6 schematically illustrates a relation between driving voltage for a liquid crystal cell according to a device control program and intensity of light transmitted through the liquid crystal cell.

FIG. 6 schematically illustrates a relation between the driving voltage for the liquid crystal cell 121 according to the device control program 221 and the intensity of light transmitted through the liquid crystal cell 121. The device control program 221 supplies rectangular waves 401 that cyclically oscillates between predetermined positive and negative voltages to keep the liquid crystal cell 121 ON. The liquid crystal cell 121 is ON at either the positive voltage or the negative voltage. A measurement period 421 is defined in a period (ON period) 411 where the liquid crystal cell 121 is ON.

The device control program 221 makes the imaging device 125 receive fluorescence during the measurement period 421 to take an image of the fluorescence. When the liquid crystal cell 121 is ON, the imaging device 125 receives the polarization component perpendicular to the polarization direction of the excitation light out of the fluorescence from the sample. The intensity $I\perp$ of the received light is expressed by the total amount or the time average of the light received during the measurement period 421.

The device control program 221 supplies zero voltage 402 to turn OFF the liquid crystal cell 121. A measurement period 422 is defined in a period (OFF period) 412 where the liquid crystal cell 121 is OFF. The device control program 221 makes the imaging device 125 receive fluorescence during the measurement period 422 to take an image of the fluorescence. When the liquid crystal cell 121 is OFF, the imaging device 125 receives the polarization component parallel to the polarization direction of the excitation light out of the fluorescence from the sample. The intensity $I//$ of the received light is expressed by the total amount or the time average of the light received during the measurement period 422.

Figure 7:
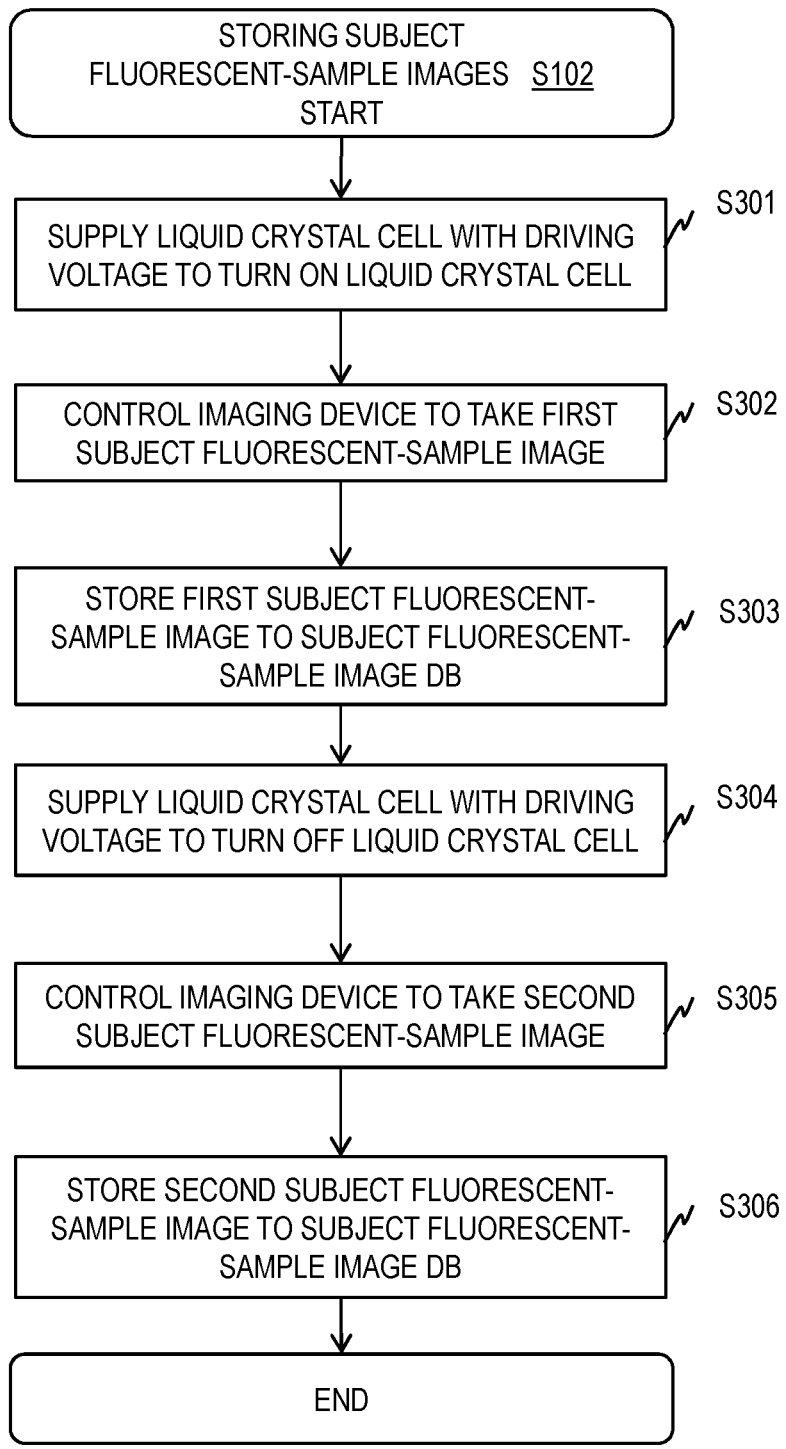
FIG. 7 is a flowchart of an example of the details of the step of storing subject fluorescent-sample images.

FIG. 7 is a flowchart of an example of the details of the step S102 of storing subject fluorescent-sample images. The subject fluorescent sample is placed on the stage 117 by the operator. The device control program 221 supplies the liquid crystal cell 121 with a driving voltage to turn ON the liquid crystal cell 121 (S301).

The device control program 221 makes the imaging device 125 receive light for a predetermined exposure period to take a first subject fluorescent-sample image (S302). The first subject fluorescent-sample image is an image of the linear polarization component of the fluorescence that is perpendicular to the polarization direction of the excitation light. The device control program 221 acquires the first subject fluorescent-sample image from the imaging device 125 and stores it to the subject fluorescent-sample image database 232 (S303).

Next, the device control program 221 supplies the liquid crystal cell 121 with a driving voltage to turn OFF the liquid crystal cell 121 (S304). The device control program 221 makes the imaging device 125 receive light for a predetermined exposure period to take a second subject fluorescent-sample image (S305). The second subject fluorescent-sample image is an image of the linear polarization component of the fluorescence that is parallel to the polarization direction of the excitation light. The device control program 221 acquires the second subject fluorescent-sample image from the imaging device 125 and stores it to the subject fluorescent-sample image database 232 (S306).

Figure 8:
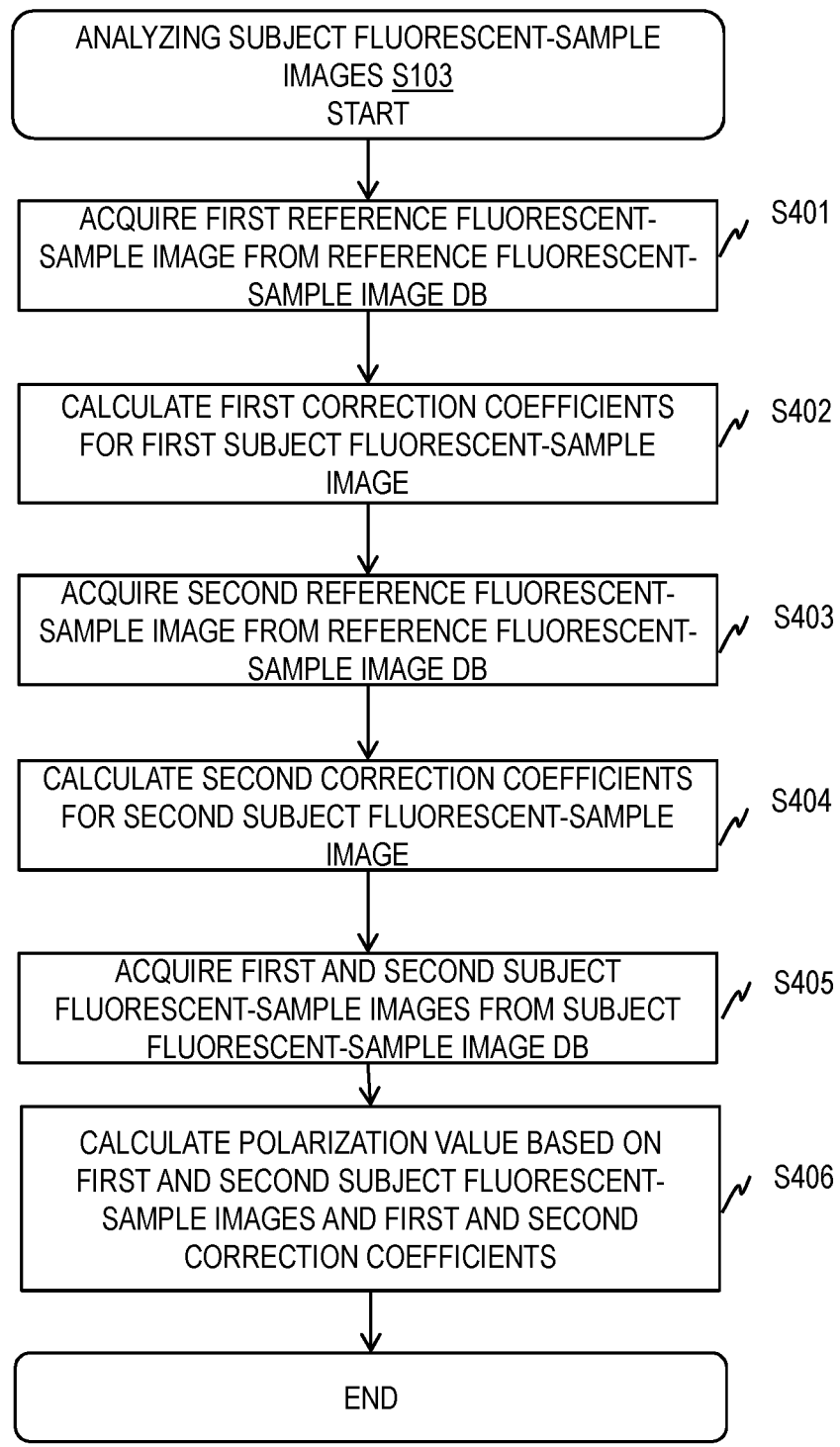
FIG. 8 is a flowchart of an example of details of the step of analyzing subject fluorescent-sample images.

FIG. 8 is a flowchart of an example of the details of the step S103 of analyzing subject fluorescent-sample images. The fluorescent image analysis program 222 acquires a first reference fluorescent-sample image from the reference fluorescent-sample image database 231 (S401). The first reference fluorescent-sample image is a reference fluorescent-sample image obtained by capturing the linear polarization component perpendicular to the polarization direction of the excitation light. The fluorescent image analysis program 222 calculates correction coefficients (first correction coefficients) for the first subject fluorescent-sample image (S402). The details of calculating the first correction coefficients will be described later.

The fluorescent image analysis program 222 acquires a second reference fluorescent-sample image from the reference fluorescent-sample image database 231 (S403). The second reference fluorescent-sample image is a reference fluorescent-sample image obtained by capturing the linear polarization component parallel to the polarization direction of the excitation light. The fluorescent image analysis program 222 calculates correction coefficients (second correction coefficients) for the second subject fluorescent-sample image (S404). The details of calculating the second correction coefficients will be described later.

Next, the fluorescent image analysis program 222 acquires the first and the second subject fluorescent-sample images from the subject fluorescent-sample image database 232 (S405). The fluorescent image analysis program 222 calculates the polarization value of the subject fluorescent sample based on the first and the second correction coefficients and the first and the second subject fluorescent-sample images (S406). The fluorescent image analysis program 222 stores the calculated polarization value to the auxiliary storage device 203 and outputs it to the output device 204. The fluorescent image analysis program 222 may also output the first and the second subject fluorescent-sample images to the output device 204.

Correction Method

Hereinafter, a method of calculating correction coefficients based on reference fluorescent-sample images is described. The fluorescent image analysis program 222 calculates first correction coefficients from a first reference fluorescent-sample image. In the field of view in this example, the region occupied by the reference fluorescent sample includes all regions of interest (ROIs) of the subject fluorescent sample. The in-plane intensity of the fluorescence emitted from the reference fluorescent sample is uniform. This intensity does not need to be uniform, if the relation of in-plane fluorescence intensities is known.

The first correction coefficients are for the subject fluorescent-sample image (the first subject fluorescent-sample image) obtained by capturing the linear polarization component perpendicular to the polarization direction of the linearly polarized excitation light. The correction coefficients are determined separately for individual pixels. A correction coefficient $a\perp(i,j)$ can be calculated by the following formula:

$$a\perp(i,j)=(1/Ir\perp(i,j))*|Ir\perp(i,j)|,$$

where $Ir\perp(i,j)$ represents the light intensity (the intensity of received light) at the pixel $(i,j)$ in the first reference fluorescent-sample image and $|Ir\perp(i,j)|$ represents the mean value of the light intensities of a plurality of pixels constituting a predetermined region including the pixel $(i,j)$ in the first reference fluorescent-sample image.

The predetermined region can be the whole captured image (field of view), a region consisting all pixels where the intensity of the fluorescence received from the reference fluorescent sample is higher than a threshold, or a partial region of the image including a plurality of ROIs of the subject fluorescent sample. When the predetermined region includes all pixels where the fluorescence from the reference fluorescent sample is received, a larger number of pixels can be calibrated to achieve more precise correction.

The fluorescent image analysis program 222 calculates second correction coefficients from a second reference fluorescent-sample image. The second correction coefficients are for the subject fluorescent-sample image (the second subject fluorescent-sample image) obtained by capturing the linear polarization component parallel to the polarization direction of the linearly polarized excitation light. A correction coefficient $a//(i,j)$ can be calculated by the following formula:

$$a//(i,j)=(1/Ir//(i,j))*|Ir//(i,j)|,$$

where $Ir//(i,j)$ represents the light intensity (the intensity of received light) at the pixel $(i,j)$ in the second reference fluorescent-sample image and $|Ir//(i,j)|$ represents the mean value of the light intensities of a plurality of pixels constituting a predetermined region including the pixel $(i,j)$ in the second reference fluorescent-sample image. The predetermined region is the region corresponding to the predetermined region of the first reference fluorescent-sample image.

The fluorescent image analysis program 222 can also use correction coefficients for background correction. For example, in the case where the sample is contained in a vessel such as a microchannel in a cell, the wavelength of the light from the cell could be included in the wavelength range to be measured. Cancelling this background noise leads to more accurate measurement. The background correction coefficients (offset values) b⊥(i,j) for the first reference fluorescent-sample image and the background correction coefficients (offset values) b//(i,j) for the second reference fluorescent-sample image are predetermined.

The light intensities of individual pixels of the subject fluorescent-sample images are corrected based on the correction coefficients a⊥(i,j) and a//(i,j) calculated from the reference fluorescent-sample images and the background correction coefficients b⊥(i,j) and b//(i,j). Specifically, the corrected light intensity of a pixel in the first subject fluorescent-sample image can be expressed as the following formula:

$$Ic\bot(i,j)=a\bot(i,j)*It\bot(i,j)+b\bot(i,j),$$

where Ic⊥(i,j) represents the uncorrected light intensity of the pixel (i,j) in the first subject fluorescent-sample image taken by the imaging device 125 and Ic⊥(i,j) represents the corrected light intensity of the same pixel (i,j).

In similar, the corrected light intensity of a pixel in the second subject fluorescent-sample image can be expressed as the following formula:

$$Ic//(i,j)=a//(i,j)*It//(i,j)+b//(i,j),$$

where It//(i,j) represents the uncorrected light intensity of the pixel (i,j) in the second subject fluorescent-sample image taken by the imaging device 125 and Ic//(i,j) represents the corrected light intensity of the same pixel (i,j).

The polarization value P in an ROI is expressed as the following formula:

$$P=(Ic//-Ic\bot)/(Ic//+Ic\bot),$$

where Ic// represents the sum or the mean value of the corrected light intensity Ic//(i,j) of the pixels in the ROI, and Ic⊥ represents the sum or the mean value of the corrected light intensity Ic⊥(i,j) of the pixels in the ROI.

The fluorescent image analysis program 222 can correct the light intensities of the pixels in a subject fluorescent-sample image in accordance with another function. For example, the fluorescent image analysis program 222 can first perform background correction to the light intensities of the pixels in the subject fluorescent-sample image and then correct the obtained values with the correction coefficients calculated from a reference fluorescent-sample image.

Specifically, the fluorescent image analysis program 222 calculates the mean value of the light intensities (background light intensities) in the background region (the region that does not include the sample). Taking a cell having a microchannel as an example, the fluorescent image analysis program 222 calculates the mean value b of the light intensities in the region excluding the microchannel. The region to calculate the mean value can have a size equal to an ROI of the sample.

The fluorescent image analysis program 222 corrects the light intensity It(i,j) of each pixel in a subject fluorescent-sample image obtained by capturing the linear polarization component either parallel or perpendicular to the excitation light in accordance with the following formula:

$$Ic(i,j)=a(i,j)*(It(i,j)-b),$$

where Ic(i,j) represents the corrected light intensity of the pixel (i,j), a(i,j) represents the correction coefficient calculated from the reference fluorescent-sample image, It(i,j) represents the uncorrected light intensity of the pixel (i,j), and b represents the background correction coefficient.

The effects of the dichroic mirror 113 and the light source 101 on the intensity of the light received at a pixel can be different depending on the polarization direction component. Accordingly, the fluorescence polarization of a subject sample can be measured more accurately by using the correction coefficient for the linear polarization component parallel to the linear polarization direction of the excitation light and the correction coefficient for the linear polarization component perpendicular to the linear polarization direction of the excitation light. The fluorescent image analysis program 222 can use only one reference fluorescent-sample image obtained by capturing either linear polarization component, depending on the system design.

Examples of Measurement Results

Figure 9:
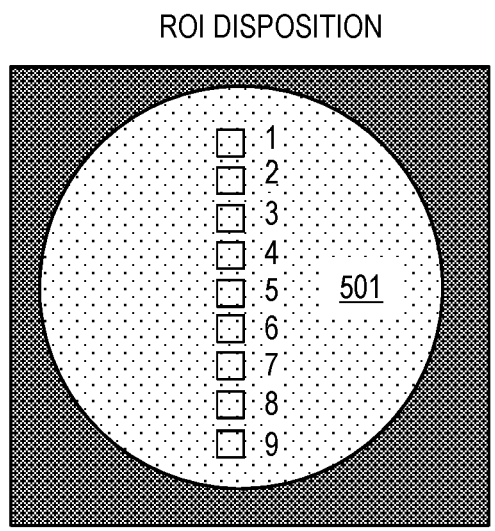
FIG. 9 illustrates locations of ROIs.

Hereinafter, examples of measurement results obtained from fluorescent samples are described. FIG. 9 illustrates locations of ROIs. Nine ROIs are defined in the region of the sample within the captured image (field of view). The numerals in the sample region 501 represent the numbers of the ROIs. The subject fluorescent sample was a liquid material (fluorescently labeled solution) contained in a vessel. The reference fluorescent sample was a YAG ceramic piece.

Figure 10:
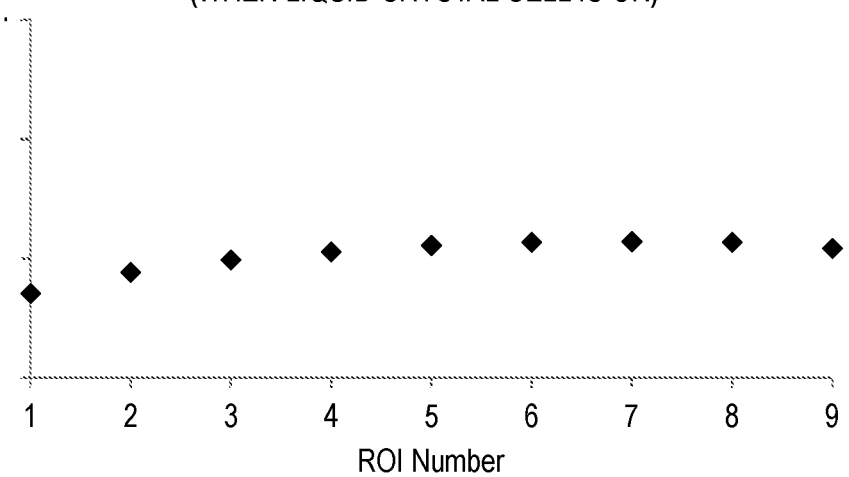
FIG. 10 is a graph of uncorrected light intensities measured from a subject fluorescent sample (when the liquid crystal cell is ON)

FIG. 10 is a graph of uncorrected light intensities measured from a subject fluorescent sample (when the liquid crystal cell is ON). The horizontal axis represents ROI number and the vertical axis represents light intensity in the ROI. The light intensity in an ROI is the sum of the light intensities at the pixels (the pixels of the imaging device 125) included in the ROI. Since the liquid crystal cell 121 is ON, the measured intensities of the fluorescence are the light intensities of the linear polarization component perpendicular to the linear polarization direction of the excitation light.

Figure 11:
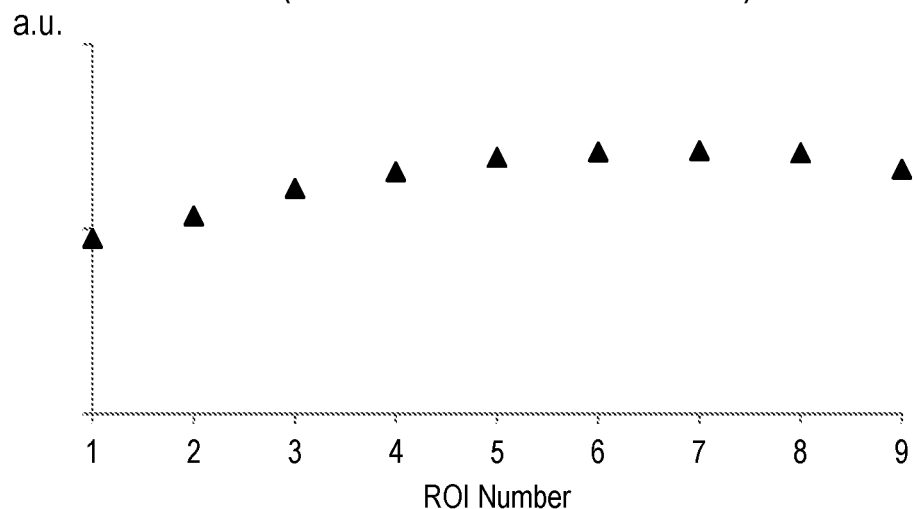
FIG. 11 is a graph of light intensities measured from a reference fluorescent sample (when the liquid crystal cell is ON)

FIG. 11 is a graph of light intensities measured from a reference fluorescent sample (when the liquid crystal cell is ON). The horizontal axis represents ROI number and the vertical axis represents light intensity in the ROI. Since the liquid crystal cell 121 is ON, the measured intensities of the fluorescence are the light intensities of the linear polarization component perpendicular to the linear polarization direction of the excitation light.

Figure 12:
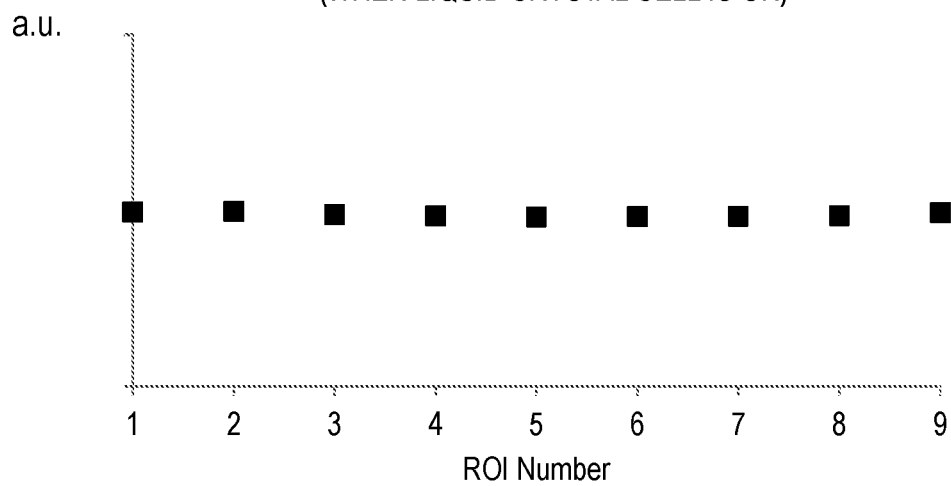
FIG. 12 is a graph of the results after the light intensities measured from a subject fluorescent sample were corrected based on the light intensities measured from the reference fluorescent sample.

FIG. 12 is a graph of the results after the light intensities measured from a subject fluorescent sample were corrected based on the light intensities measured from the reference fluorescent sample. The horizontal axis represents ROI number and the vertical axis represents light intensity in the ROI. Compared to the graph of FIG. 10, the graph of FIG. 12 shows small differences (variations) in measured light intensity among the ROIs. The light intensities measured from the subject fluorescent sample should be uniform within the plane. FIG. 12 teaches that more accurate measurement on a subject fluorescent sample is achieved with the correction based on the light intensities measured from the reference fluorescent sample.

Figure 13:
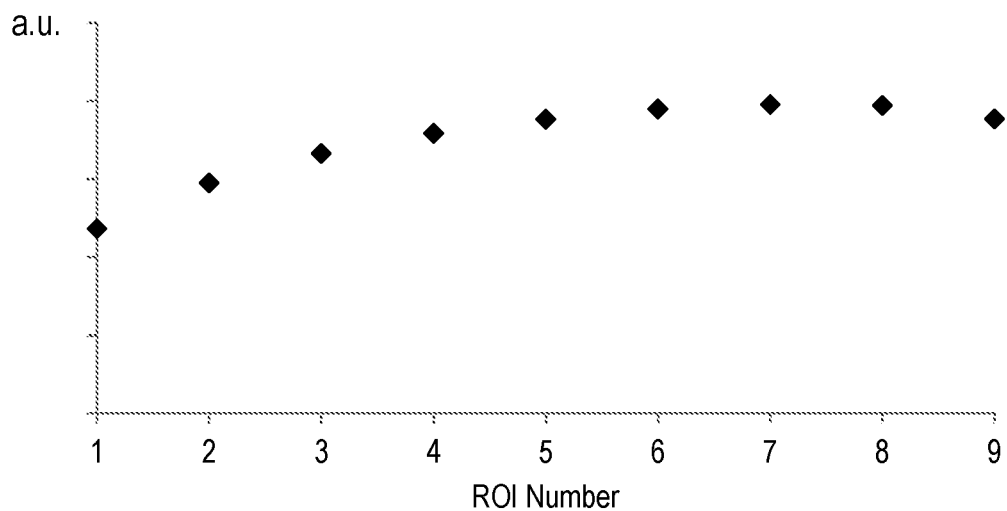
FIG. 13 is a graph of uncorrected light intensities measured from a subject fluorescent sample (when the liquid crystal cell is OFF)

FIG. 13 is a graph of uncorrected light intensities measured from a subject fluorescent sample (when the liquid crystal cell is OFF). The horizontal axis represents ROI number and the vertical axis represents light intensity in the ROI. Since the liquid crystal cell 121 is OFF, the measured intensities of the fluorescence are the light intensities of the linear polarization component parallel to the linear polarization direction of the excitation light.

Figure 14:
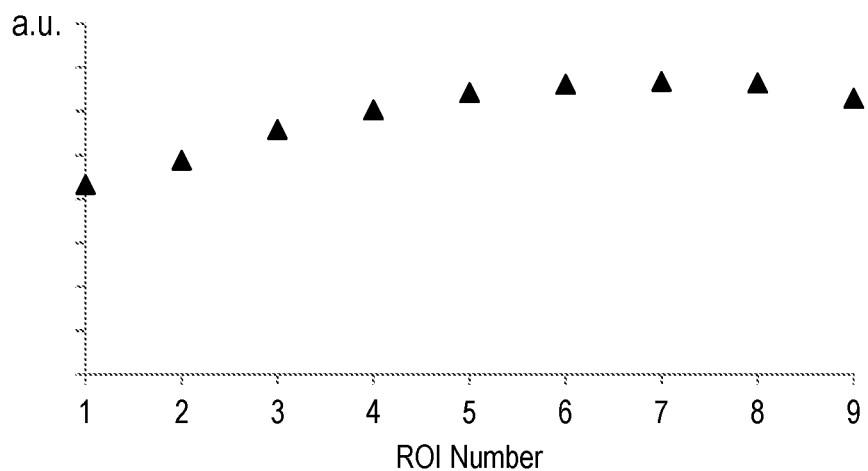
FIG. 14 is a graph of light intensities measured from a reference fluorescent sample (when the liquid crystal cell is OFF)

FIG. 14 is a graph of light intensities measured from a reference fluorescent sample (when the liquid crystal cell is OFF). The horizontal axis represents ROI number and the vertical axis represents light intensity in the ROI. Since the liquid crystal cell 121 is OFF, the measured intensities of the fluorescence are the light intensities of the linear polarization component parallel to the linear polarization direction of the excitation light.

Figure 15:
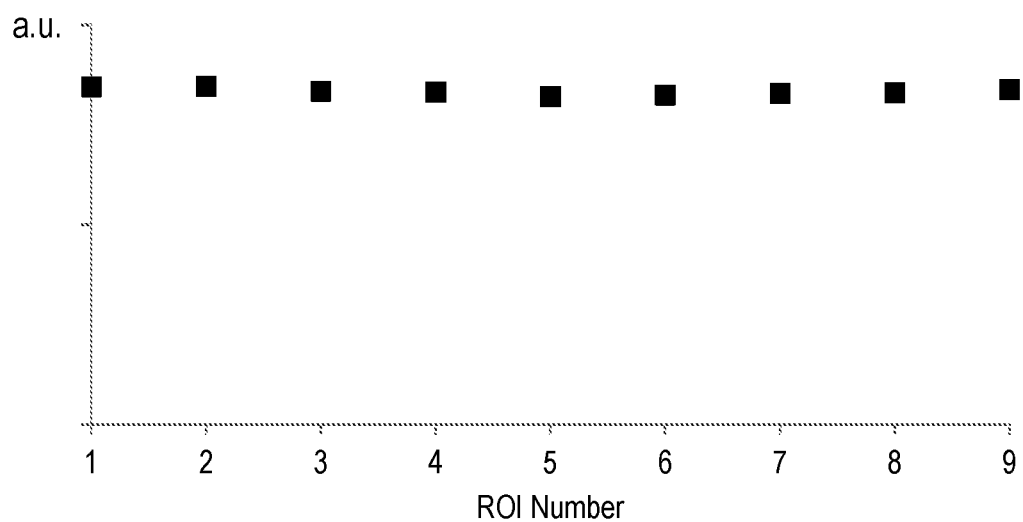
FIG. 15 is a graph of the results after the light intensities measured from a subject fluorescent sample were corrected based on the light intensities measured from the reference fluorescent sample.

FIG. 15 is a graph of the results after the light intensities measured from a subject fluorescent sample were corrected based on the light intensities measured from the reference fluorescent sample. The horizontal axis represents ROI number and the vertical axis represents light intensity in the ROI. Compared to the graph of FIG. 13, the graph of FIG. 15 shows small differences (variations) in measured light intensity among the ROIs. The light intensities measured from the subject fluorescent sample should be uniform within the plane. FIG. 15 teaches that more accurate measurement on a subject fluorescent sample is achieved with the correction based on the light intensities measured from the reference fluorescent sample.

The above-described configuration example controls the liquid crystal cell 121 to extract different polarization components from fluorescence. Another configuration example can employ a polarizing plate in place of the liquid crystal cell 121. The operator or the fluorescence polarization measurement controller 20 changes the orientation of the polarizing plate to extract a desired polarization component from fluorescence.

The above-described example uses the measured values in a reference fluorescent-sample image in determining the correction coefficients. Another configuration example can use two-dimensional curve fitting based on interpolation or regression analysis to correct the light intensities of the pixels of the reference fluorescent-sample image. This operation reduces the noise in the reference fluorescent-sample image to achieve more appropriate calibration. Any fitting function can be used; for example, a curve that fits the X-direction and the Y-direction of the imaging plane (pixel array) to the measured values can be defined by a function of a predetermined degree (for example, six).

The above-described example calculates the mean value of the light intensities in an ROI inclusive of the light intensities of the noise, without removing random fixed-pattern noise generated by the image sensor. Another configuration example determines fixed-pattern noise pixels (so-called hot pixels) out of the pixels having fixed-pattern noise based on a predetermined threshold (image sensor noise threshold) and excludes them.

To determine the threshold for the light intensity of a pixel, the fluorescent image analysis program 222 calculates a mean value of the light intensities of the neighboring 24 pixels (5 (in a vertical line)×5 (in a horizontal line)−1 (the pixel of interest)=24 pixels), for example. The fluorescent image analysis program 222 determines that the pixel is a fixed-pattern noise pixel if the light intensity of the pixel is higher than 105% of the calculated mean value. The fluorescent image analysis program 22 performs this calculation on all pixels in an image to generate an x-y coordinate map of the fixed-pattern noise pixels. In calculating the light intensities of the subject fluorescent sample and the reference fluorescent sample, the fluorescent image analysis program 222 excludes the fixed-pattern noise pixels in the x-y coordinate map and calculates the light intensities with the remaining pixels.

Embodiment 2

Measurement Method

Figure 16:
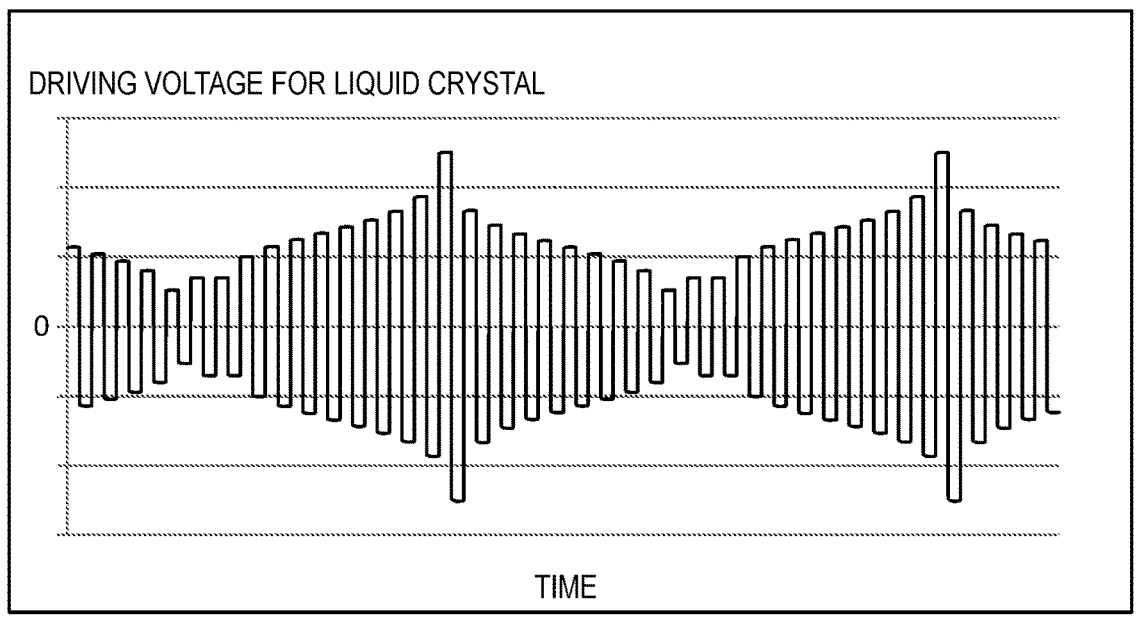
FIG. 16 illustrates an example of the temporal change of the voltage applied to the liquid crystal cell in Embodiment 2.

Correction to the light intensities measured from a subject fluorescent sample by another method is described. Differences from Embodiment 1 are mainly described. The device control program 221 applies voltage changing in cycles longer than the inversion cycle to the liquid crystal cell 121. FIG. 16 illustrates an example of the temporal change of the voltage applied to the liquid crystal cell 121. The horizontal axis represents time and the vertical axis represents applied voltage. As illustrated in FIG. 16, the applied voltage is inverted between a positive value and a negative value at high frequency. The positive envelope and the negative envelope are line-symmetric about the horizontal axis. The envelopes vary in cycles longer than the inversion cycle.

Figure 17:
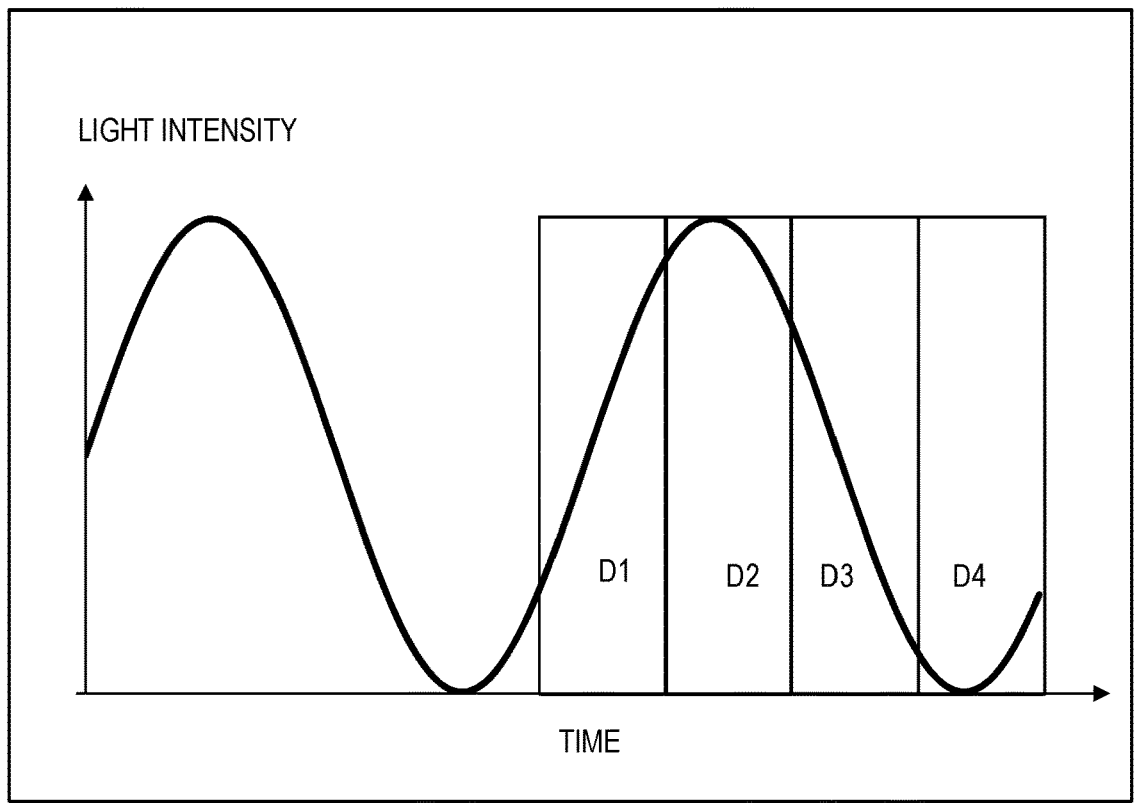
FIG. 17 schematically illustrates the change in light intensity of fluorescence transmitted through the liquid crystal cell when the voltage illustrated in FIG. 16 is applied to the liquid crystal cell.

FIG. 17 schematically illustrates the change in light intensity of fluorescence transmitted through the liquid crystal cell 121 when the voltage illustrated in FIG. 16 is applied to the liquid crystal cell 121. The intensity of the fluorescence changes nearly sinusoidally. The intensity decreases with increase in absolute value of the applied voltage and increases with decrease in absolute value of the applied voltage. The waveform of the voltage applied to the liquid crystal cell 121 is not limited to a specific one as far as the light intensity changes nearly sinusoidally.

The fluorescent image analysis program 222 calculates the light intensity in an ROI in an image of a fluorescent sample in each of the periods D1 to D4. The light intensity in each period is an integrated value of the light intensity in the ROI in each period over time or the total amount of the light received at the pixels in the ROI in each period (exposure period). The fluorescent image analysis program 222 evaluates the fluorescence polarization of the sample based on the light intensities in the periods D1 to D4. The imaging device 125 receives a specific polarization component of the fluorescence in each of the periods D1 to D4. The polarization component in each period has some width of polarization direction.

Figure 18:
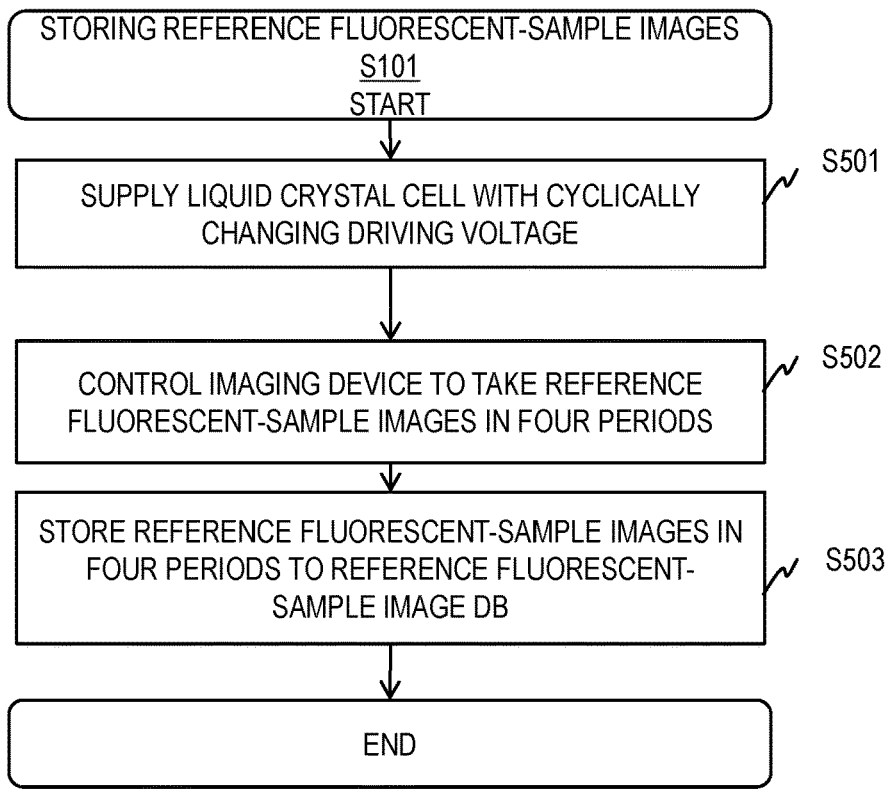
FIG. 18 is a flowchart of an example of the details of the step of storing reference fluorescent-sample images in Embodiment 2.

The general process of the measurement is the same as the method illustrated in the flowchart of FIG. 4. The details of each step in FIG. 4 are described in the following. FIG. 18 is a flowchart of an example of the details of the step S101 of storing reference fluorescent-sample images. The device control program 221 supplies the liquid crystal cell 121 with driving voltage that changes cyclically as illustrated in FIG. 16 (S501).

The device control program 221 controls the imaging device 125 to take a reference fluorescent-sample image in each of the four periods D1 to D4 (S502). The image acquired in each period indicates the amount of fluorescence received at each pixel of the imaging device 125 in the period. The device control program 221 stores the reference fluorescent-sample images in the four periods D1 to D4 to the reference fluorescent-sample image database 231 (S503).

Figure 19:
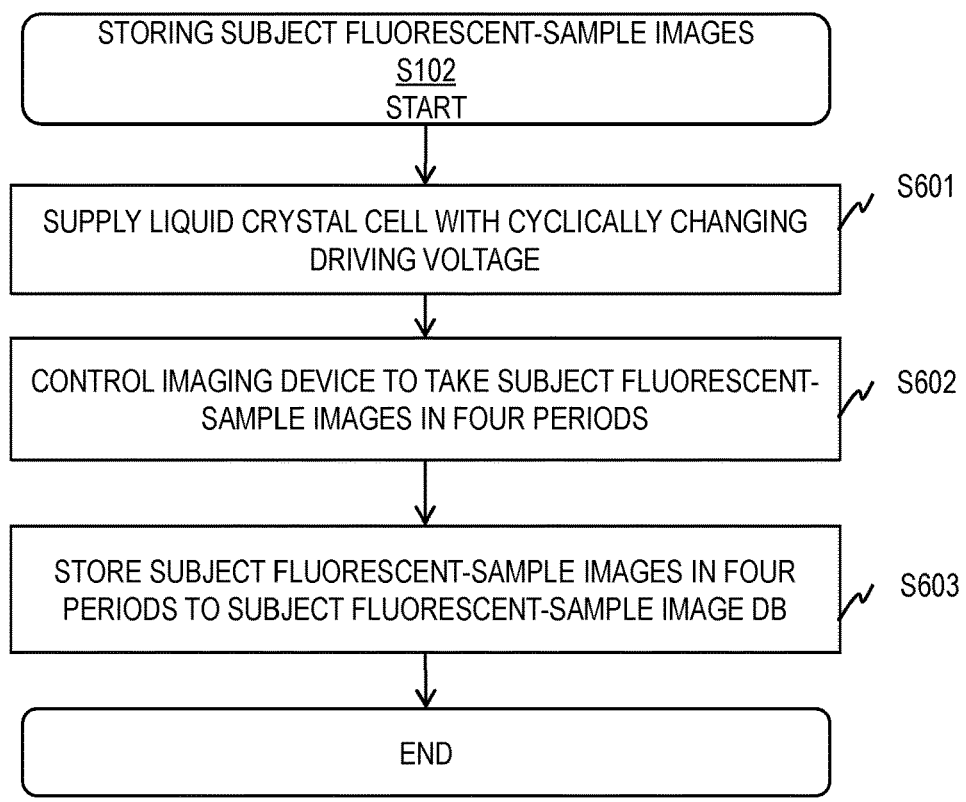
FIG. 19 is a flowchart of an example of the details of the step of storing subject fluorescent-sample images in Embodiment 2.

FIG. 19 is a flowchart of an example of the details of the step S102 of storing subject fluorescent-sample images. The device control program 221 supplies the liquid crystal cell 121 with driving voltage that changes cyclically as illustrated in FIG. 16 (S601).

The device control program 221 controls the imaging device 125 to take a subject fluorescent-sample image in each of the four periods D1 to D4 (S602). The device control program 221 stores the subject fluorescent-sample images in the four periods D1 to D4 to the subject fluorescent-sample image database 232 (S603).

Figure 20:
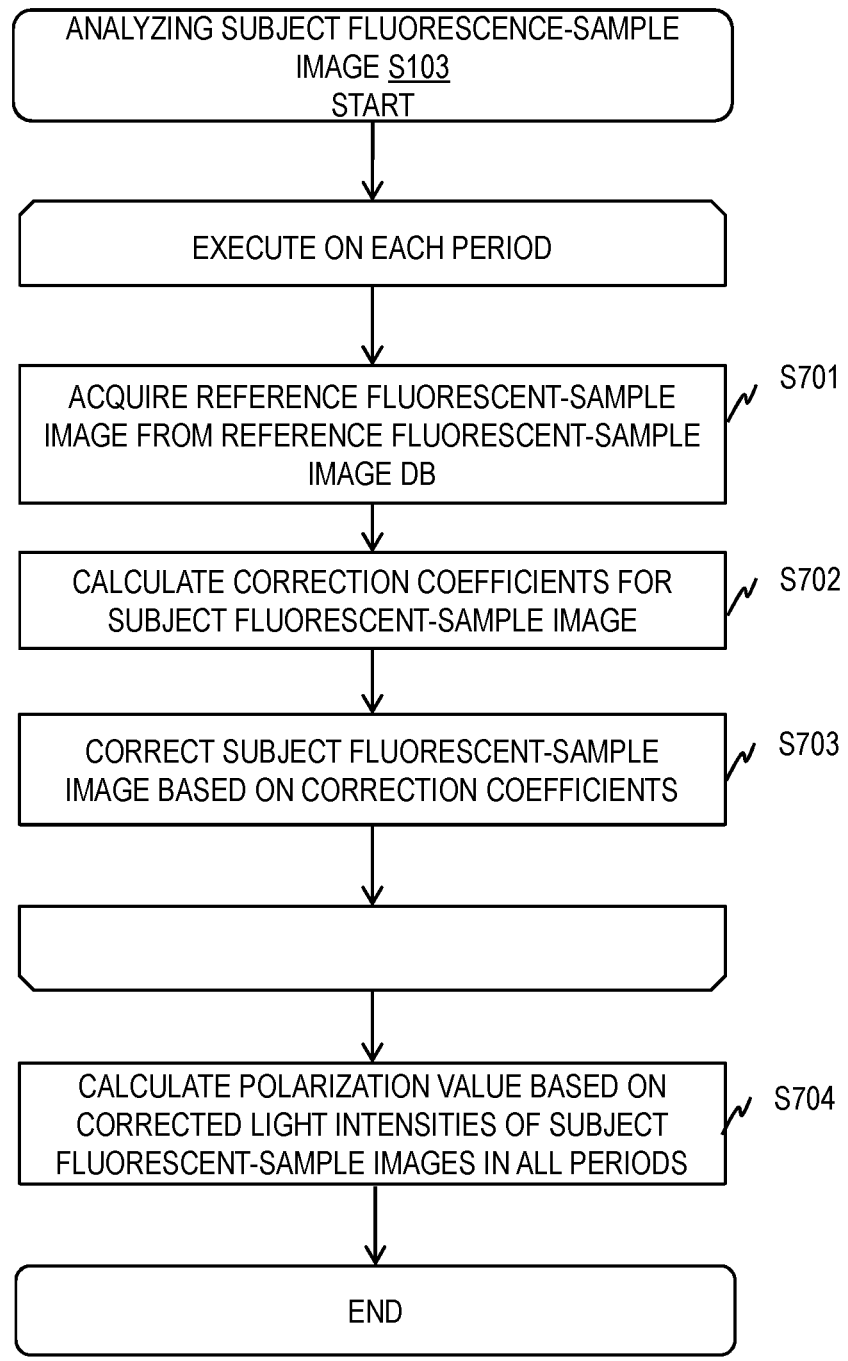
FIG. 20 is a flowchart of an example of the details of the step of analyzing subject fluorescent-sample images in Embodiment 2.

FIG. 20 is a flowchart of an example of the details of the step S103 of analyzing subject fluorescent-sample images. The fluorescent image analysis program 222 performs Steps S701 to S703 on the data of each period. The fluorescent image analysis program 222 acquires a reference fluorescent-sample image in the corresponding period from the reference fluorescent-sample image database 231 (S701). The fluorescent image analysis program 222 calculates correction coefficients for the subject fluorescent-sample image in the period from the acquired reference fluorescent-sample image (S702). In this example, the fluorescent image analysis program 222 calculates the correction coefficients from the reference fluorescent-sample image having the same polarization component as that of the subject fluorescent-sample image. These polarization components do not need to be the same ones.

The method of calculating the correction coefficients is the same as the method of calculating the first or the second coefficients described with reference to FIG. 8. The fluorescent image analysis program 222 determines the correction coefficient $a(i,j)$ for the light intensity of each pixel in accordance with the following formula:

$$a(i,j)=(1/Ir(i,j))*|Ir(i,j)|,$$

where $Ir(i,j)$ represents the light intensity at the pixel $(i,j)$ of the imaging device 125 in the reference fluorescent-sample image and $|Ir(i,j)|$ represents the mean value of the light intensities at a plurality of pixels constituting a predetermined region.

The fluorescent image analysis program 222 corrects the light intensities of individual pixels $(i,j)$ in the subject fluorescent-sample image based on the correction coefficients $a(i,j)$ (S703). As described in Embodiment 1, background correction coefficients can be used together.

After executing Steps S701 to S703 on the data of all periods, the fluorescent image analysis program 222 calculates the polarization value based on the corrected light intensities of the subject fluorescent-sample images in the four periods (S704). For example, the fluorescent image analysis program 222 calculates the polarization value P using the following formula:

$$P=(\pi/4\sqrt{2})*(B/A)$$

$$A=(LD1+LD2+LD3+LD4)$$

$$B=\sqrt{\{(LD1-LD3)^2+(LD2-LD4)^2\}},$$

where LD1 to LD4 are corrected light intensities (amounts of received light) in an ROI in the subject fluorescent-sample images in the four periods.

Examples of Measurement Results

Hereinafter, examples of measurement results obtained from fluorescent samples in accordance with the method described with reference to FIGS. 16 to 20 are described. Described in the following are the examples in the period D1 out of the four periods. The subject fluorescent sample was a liquid material (fluorescently labeled solution) contained in a vessel. The reference fluorescent sample was a YAG ceramic piece.

Figure 21:
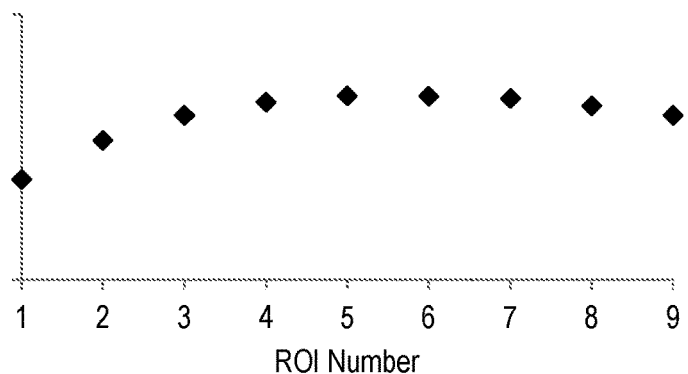
FIG. 21 is a graph of uncorrected light intensities measured from a subject fluorescent sample in a period D1.
Figure 22:
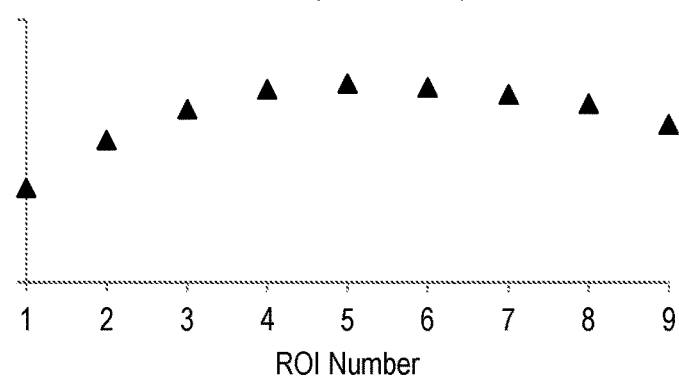
FIG. 22 is a graph of light intensities measured from a reference fluorescent sample in the period D1.
Figure 23:
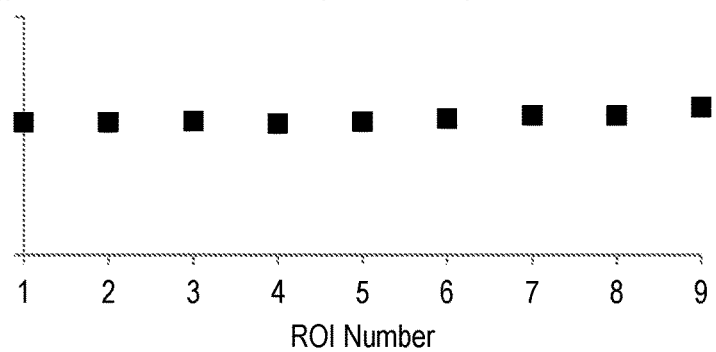
FIG. 23 is a graph of the results after the light intensities measured from a subject fluorescent sample were corrected based on the light intensities measured from the reference fluorescent sample.

FIG. 21 is a graph of uncorrected light intensities measured from a subject fluorescent sample in the period D1. The horizontal axis represents ROI number and the vertical axis represents light intensity in the ROI. FIG. 22 is a graph of light intensities measured from a reference fluorescent sample in the period D1. The horizontal axis represents ROI number and the vertical axis represents light intensity in the ROI. FIG. 23 is a graph of the results after the light intensities measured from a subject fluorescent sample were corrected based on the light intensities measured from the reference fluorescent sample. The horizontal axis represents ROI number and the vertical axis represents light intensity in the ROI.

Comparing the graph of FIG. 23 with the graph of FIG. 21, the differences (variations) in light intensity among the ROIs are reduced. The light intensities measured from the subject fluorescent sample should be uniform in the plane. FIG. 23 teaches that more accurate measurement on a subject fluorescent sample is achieved with the correction based on the light intensities measured from the reference fluorescent sample. The correction exhibited the same effect on the other periods D2 to D4.

Figure 24A:
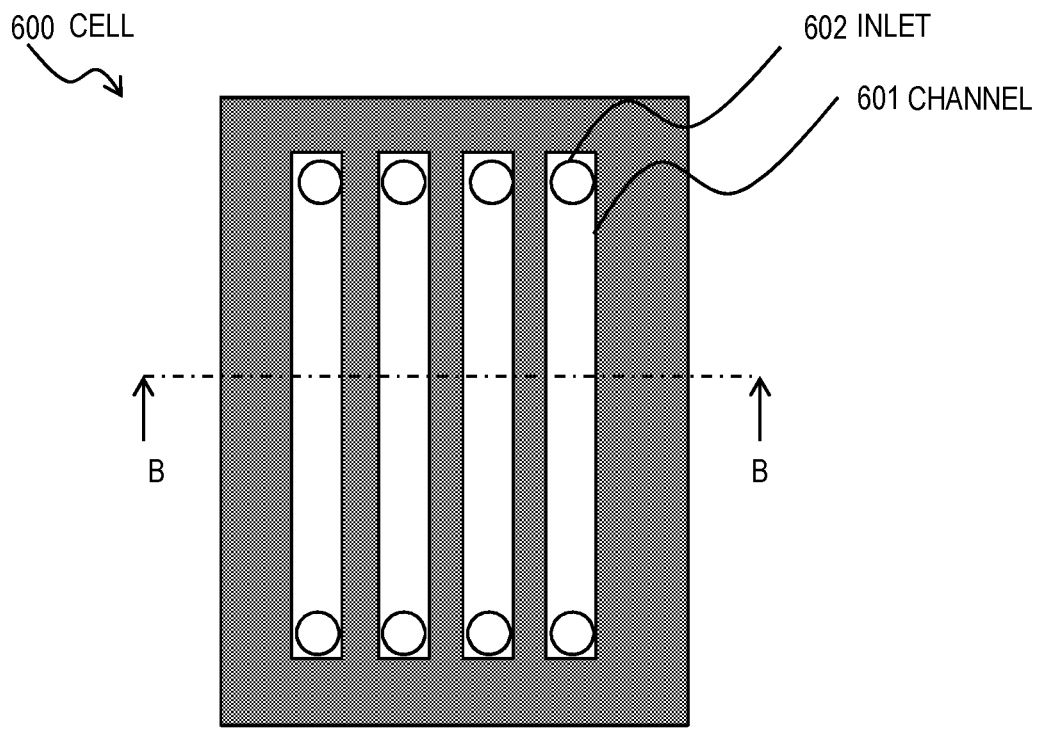
FIG. 24A schematically illustrates a configuration example of a cell for containing a liquid sample.
Figure 24B:
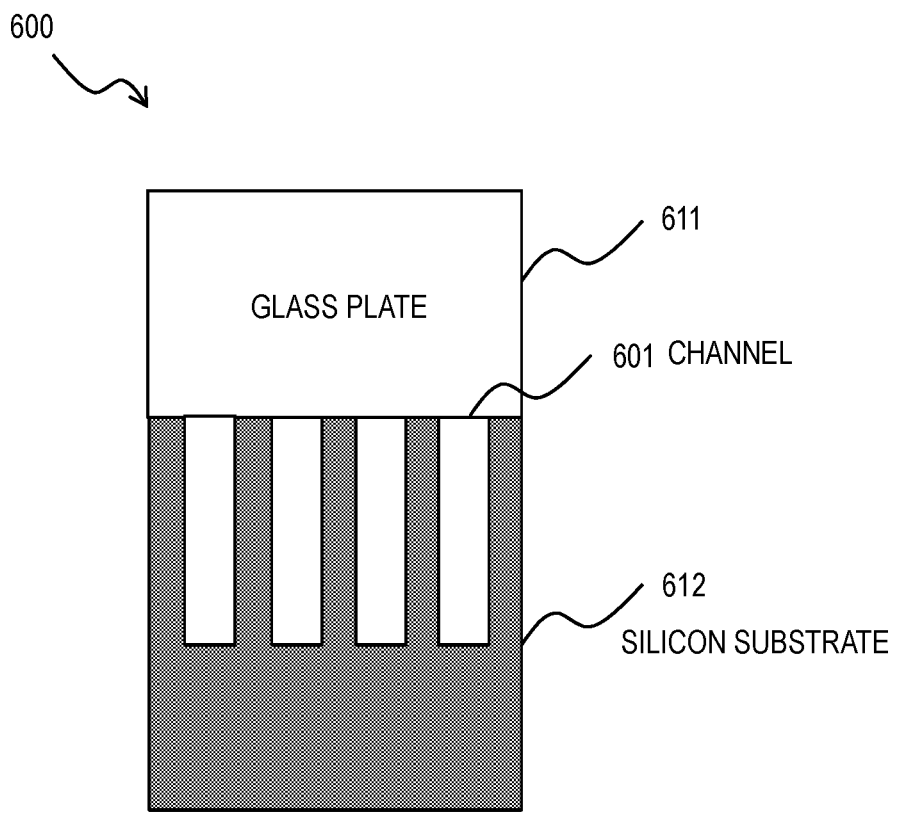
FIG. 24B illustrates a cross-sectional structure of the cell cut along the line B-B in FIG. 24A.

FIGS. 24A and 24B schematically illustrate a configuration example of a cell for containing a liquid sample. FIG. 24B illustrates a cross-sectional structure of the cell cut along the line B-B in FIG. 24A. As illustrated in FIG. 24A, the cell 600 has a plurality of microchannels 601 and inlets 602 for injecting liquid to the microchannels 601. In FIG. 24A, one of the channels is provided with a reference sign 601 and one of the inlets is provided with a reference sign 602 by way of example. The width of a channel 601 can be approximately 100 µm.

As illustrated in FIG. 24B, the cell 600 includes a colored (for example, black) silicon substrate 612 having grooves corresponding to the channels 601 and a transparent glass plate 611 overlaid on the silicon substrate 612 to close the grooves. The cell 600 is placed on the stage 117 so that the glass plate 611 faces the imaging device 125. The excitation light passes through the glass plate 611 and impinges on the sample; the fluorescence from the sample passes through the glass plate 611 and travels toward the objective lens 115.

Figure 25:
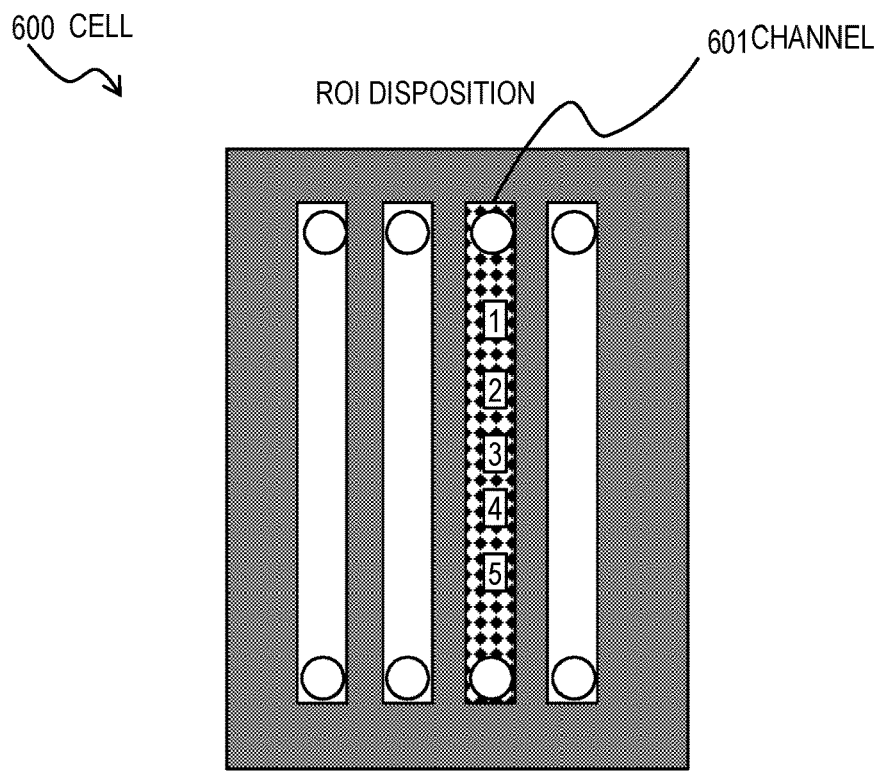
FIG. 25 illustrates locations of ROIs.

Hereinafter, examples of measurement results obtained from the sample contained in a cell having microchannels are described. FIG. 25 illustrates locations of ROIs. Five ROIs are defined in each channel 601 containing the sample. The numerals in the rectangles representing ROIs indicate the numbers of the ROIs. The subject fluorescent sample is a liquid material (fluorescently labeled solution) contained in the cell. The reference fluorescent sample is a Ce: YAG ceramic piece.

Figure 26:
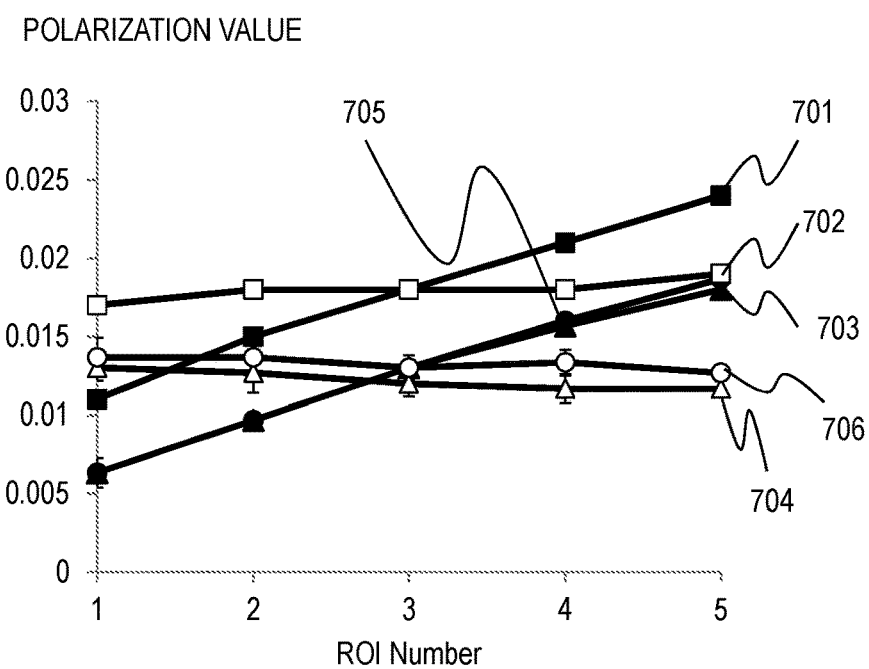
FIG. 26 is a graph showing polarization values before and after correction in accordance with the method described with reference to FIGS. 4 to 8.

FIG. 26 is a graph showing polarization values before and after the correction in accordance with the method described with reference to FIGS. 4 to 8. The horizontal axis represents ROI number and the vertical axis represents polarization value. FIG. 26 shows the polarization values of the sample in different channels calculated before and after the correction. The line 701 represents the polarization values about the first channel before the correction and the line 702 represents the polarization values about the first channel after the correction. The line 703 represents the polarization values about the second channel before the correction and the line 704 represents the polarization values about the second channel after the correction. The line 705 represents the polarization values about the third channel before the correction and the line 706 represents the polarization values about the third channel after the correction.

Comparing the polarization values of the same channel, the differences (variations) in polarization value among the ROIs are reduced after the correction. The light intensities measured from the subject fluorescent sample should be uniform independently from the ROIs. FIG. 26 teaches that more accurate measurement on a subject fluorescent sample is achieved with the correction based on the light intensities measured from the reference fluorescent sample.

Figure 27:
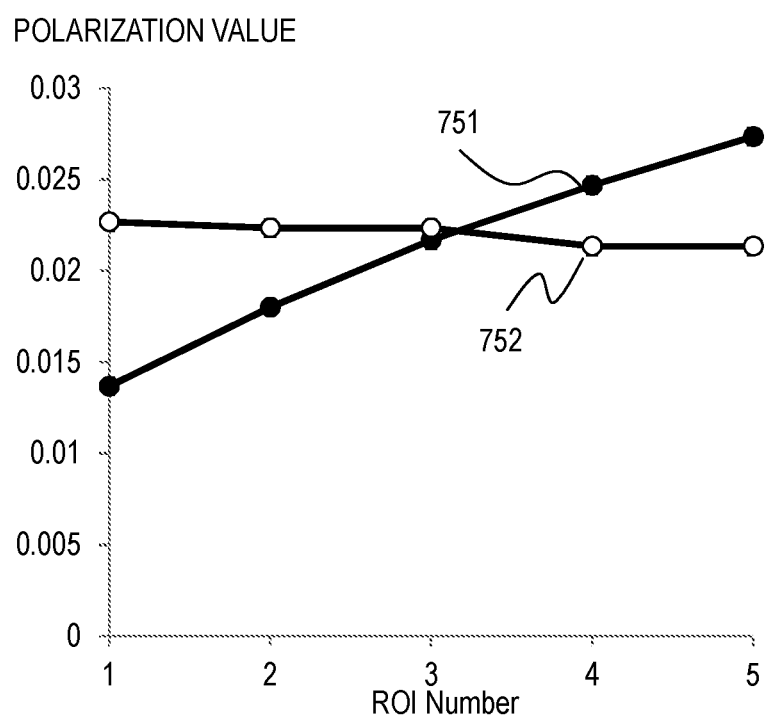
FIG. 27 is a graph showing polarization values before and after correction in accordance with the method described with reference to FIGS. 16 to 20.

FIG. 27 is a graph showing polarization values before and after the correction in accordance with the method described with reference to FIGS. 16 to 20. The horizontal axis represents ROI number and the vertical axis represents polarization value. FIG. 27 shows the polarization values of the sample contained in one channel calculated before and after the correction. The line 751 represents the polarization values calculated before the correction and the line 752 represents the polarization values calculated after the correction. The differences (variations) in polarization value among the ROIs are reduced after the correction. The light intensities measured from the subject fluorescent sample should be uniform independently from the ROIs. FIG. 27 teaches that more accurate measurement on a subject fluorescent sample is achieved with the correction based on the light intensities measured from the reference fluorescent sample.

This Embodiment 2 can also be configured to exclude the x-y coordinates of the fixed-pattern noise pixels and calculate the light intensities of the subject fluorescent sample and the reference fluorescent sample with the remaining pixels, as described in Embodiment 1.

Embodiment 3

Device Configuration

Figure 28:
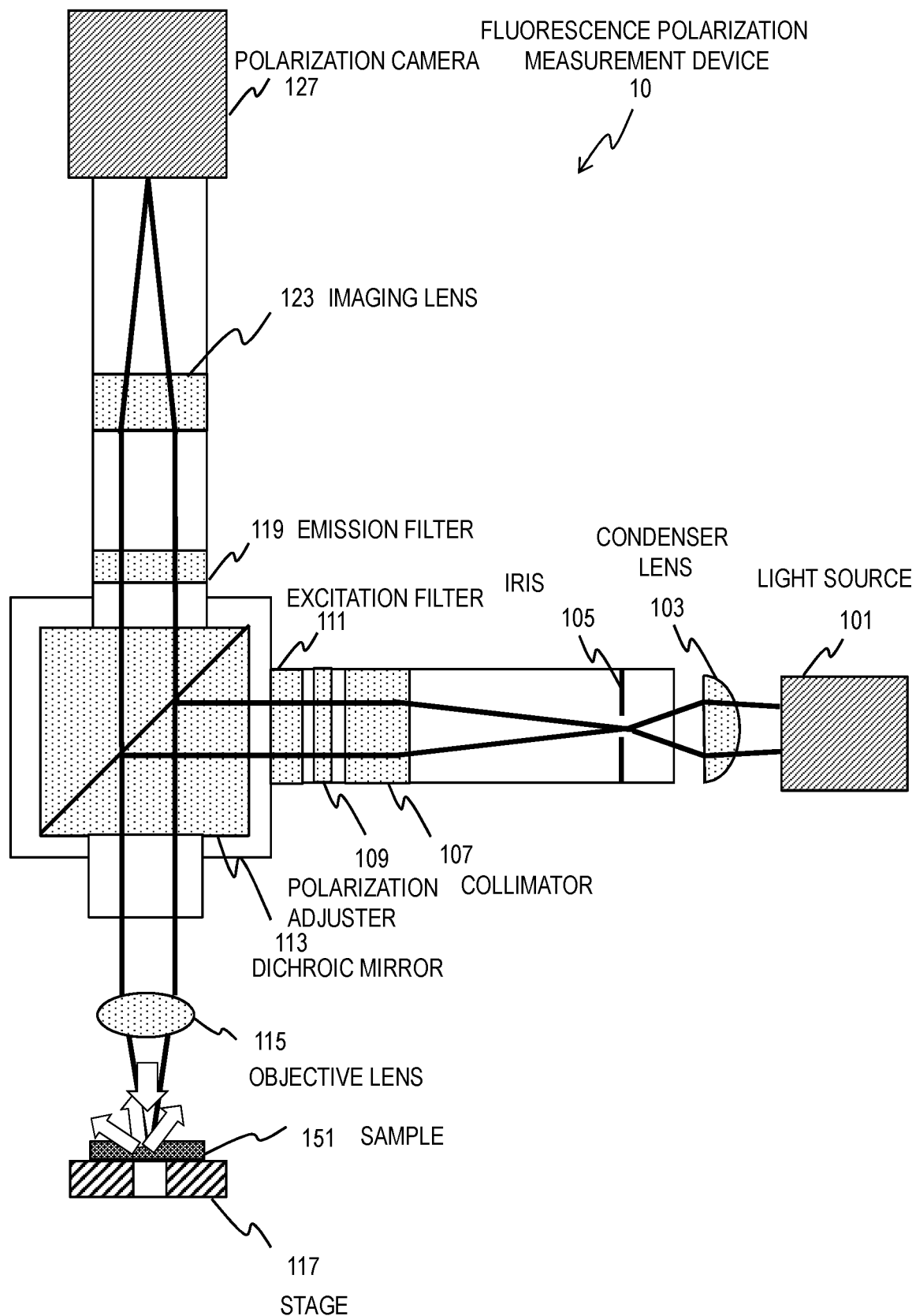
FIG. 28 schematically illustrates another configuration example of a fluorescence polarization measurement device.

A measurement method using a fluorescence polarization measurement device having another device configuration is described. Differences from Embodiment 1 are mainly described. The fluorescence polarization measurement device is configured as illustrated in FIG. 28. The differences from the configuration in Embodiment 1 in FIG. 1 are the following two points: (1) the device in Embodiment 3 does not include a polarizing plate or a liquid crystal cell as a polarization adjuster on the emission side and (2) the device in Embodiment 3 includes a polarization camera 127 in place of a common imaging device.

The polarization camera is an imaging device that includes a polarizing filter directly above the sensor array (image sensor) to acquire polarization information on the subject. The image sensor has a plurality of pixels and the polarizing filter includes a plurality of polarizers that transmit light polarized linearly in different directions out of the fluorescence. The linearly polarized light transmitted through a polarizer enters one or more pixels.

The polarization camera can simultaneously take the same number of images of the light polarized linearly in the different directions and transmitted through the polarizing filter within a specified exposure time. In the example described in the following, the polarizing filter of the polarization camera 127 transmits light polarized linearly in parallel to (at 0°) and perpendicularly to (at 90°) the polarization direction of the excitation light.

Operation

Figure 29:
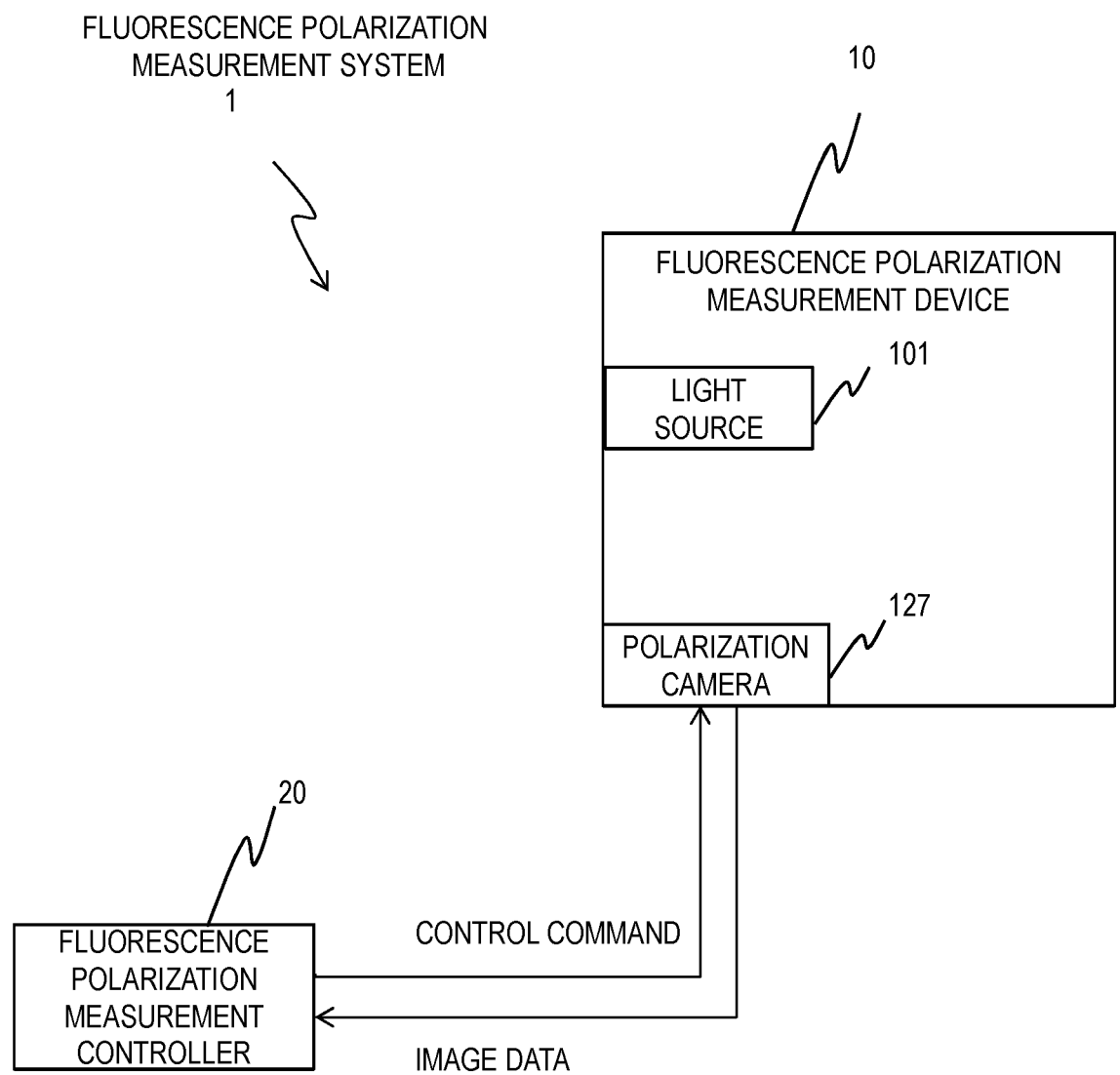
FIG. 29 schematically illustrates an example of a logical configuration of a fluorescence polarization measurement system in Embodiment 3.

Hereinafter, operation of the fluorescence polarization measurement controller 20 is described. As illustrated in FIG. 29, the device control program 221 controls the light source 101 and the polarization camera 127 of the fluorescence polarization measurement device 10. The polarization camera 127 in the example described in the following can take images of light polarized in two directions (0° and 90°). An image of fluorescence polarized in the direction of 0° is acquired by transmitting the linear polarization component that is parallel to the linearly polarized light incident on the sample. An image of fluorescence polarized in the direction of 90° is acquired by transmitting the linear polarization component that is perpendicular to the linearly polarized light incident on the sample. The conditions of the fluorescence polarized in the directions of 0° and 90° can be opposite, compared to this example. The remaining operation is the same as described in Embodiment 1. Differences from Embodiment 1 are mainly described.

For example, the fluorescence polarization measurement controller 20 keeps the light source 101 ON to illuminate the sample with excitation light during the measurement. The fluorescence polarization measurement controller 20 further controls the exposure time (imaging time), or the start time and the duration of imaging, of the polarization camera 127 to acquire image data of the desired polarization components of the fluorescence. The fluorescence polarization measurement controller 20 analyzes the acquired image data. The fluorescence polarization measurement controller 20 corrects the values measured from the subject sample based on the image of a reference sample. This operation corrects the image altered by the device configuration of the fluorescence polarization measurement device 10 to achieve more accurate measurement.

For example, the fluorescence polarization measurement controller 20 controls the exposure time (imaging time), or the start time and the duration of imaging, of the polarization camera 127 to capture the plurality of polarization components out of the fluorescence from the subject fluorescent sample for the same length of period to capture the plurality of polarization components out of the fluorescence from the reference fluorescent sample. This configuration eliminates the difference among images caused by temporal change, achieving accurate measurement.

Measurement Method

Embodiment 3 is configured to acquire subject fluorescent-sample images and reference fluorescent-sample images by separately capturing the linear polarization components parallel and perpendicular to the linear polarization direction of the excitation light, like Embodiment 1.

Figure 30:
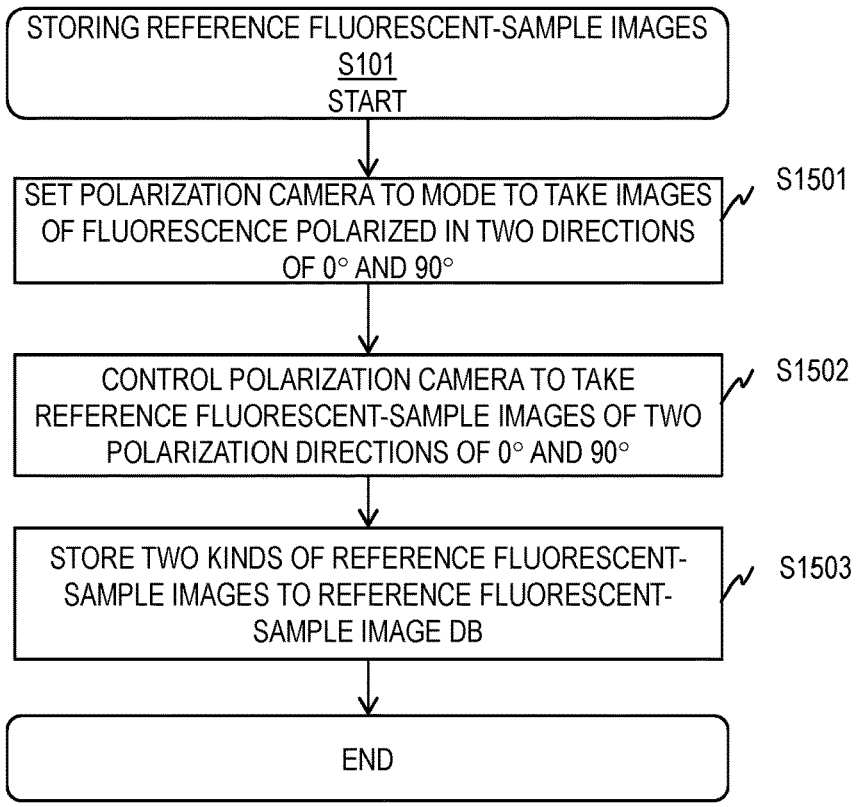
FIG. 30 is a flowchart of the details of the step of storing reference fluorescent-sample images in Embodiment 3.

The general process of the measurement is the same as the method in Embodiment 1 illustrated in the flowchart of FIG. 4. Differences from Embodiment 1 are mainly described. FIG. 30 is a flowchart of an example of the details of the step S101 of storing reference fluorescent-sample images. The device control program 221 sets the polarization camera 127 into the mode to take images of fluorescence polarized in two directions (of 0° and 90°) (S1501) and takes reference fluorescent-sample images of the two polarization directions (0° and 90°) simultaneously (S1502). The image of the polarization direction of 0° is a reference fluorescent-sample image obtained by capturing the polarization component parallel to the linear polarization direction of the excitation light and the image of the polarization direction of 90° is a reference fluorescent-sample image obtained by capturing the polarization component perpendicular to the linear polarization direction of the excitation light. The device control program 221 stores the acquired images to the reference fluorescent-sample image database 231 (S1503).

Figure 31:
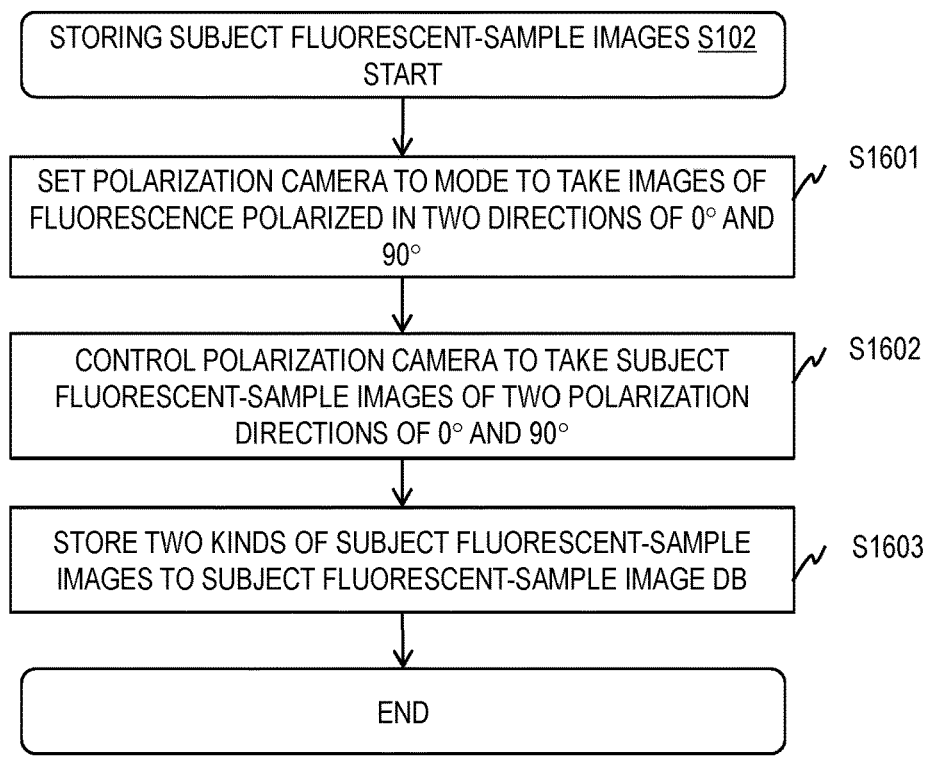
FIG. 31 is a flowchart of details of the step of storing subject fluorescent-sample images in Embodiment 3.

FIG. 31 is a flowchart of an example of the details of the step S102 of storing subject fluorescent-sample images. The device control program 221 sets the polarization camera 127 into the mode to take images of fluorescence polarized in two directions (of 0° and 90°) (S1601) and takes subject fluorescent-sample images of the two directions (0° and 90°) simultaneously (S1602). The image of the polarization direction of 0° is a subject fluorescent-sample image obtained by capturing the polarization component parallel to the linear polarization direction of the excitation light and the image of the polarization direction of 90° is a subject fluorescent-sample image obtained by capturing the polarization component perpendicular to the linear polarization direction of the excitation light. The device control program 221 stores the acquired images to the subject fluorescent-sample image database 232 (S1603).

The fluorescent image analysis program 222 calculates the correction coefficients (first correction coefficients and second correction coefficients) for the first and the second subject fluorescent-sample images in accordance with the flowchart of FIG. 8, like in Embodiment 1.

The fluorescent image analysis program 222 corrects the light intensities of individual pixels (i,j) in each of the subject fluorescent-sample images using the obtained correction coefficients. As described in Embodiment 1, background correction coefficients can be used together.

This Embodiment 3 can also be configured to exclude the x-y coordinates of the fixed-pattern noise pixels and calculate the light intensities of the subject fluorescent sample and the reference fluorescent sample with the remaining pixels, as described in Embodiment 1.

Examples of Measurement Results

Hereinafter, examples of measurement results obtained from fluorescent samples with the polarization camera described in Embodiment 3 are described. Described in the following are the examples about the images of the linear polarization component parallel to the linear polarization direction of the excitation light acquired when the polarization direction of the polarization camera 127 is 0°. The subject fluorescent sample was a liquid material (fluorescently labeled solution) contained in a vessel. The reference fluorescent sample was a YAG ceramic piece.

FIG. 32 provides mean values of uncorrected and corrected light intensities measured by the polarization camera 127 from a subject fluorescent sample filled in five channels of a microchannel cell. The subject fluorescent sample filled in the five channels were in the same concentration level and the polarization direction of the polarization camera 127 was 0° to take an image of the light polarized in the direction parallel to the linear polarization direction of the excitation light. The measured light intensities were corrected based on the light intensities measured from the reference fluorescent sample. The vertical axis represents the mean light intensity among the five channels. FIG. 33 provides standard deviations (σ) of the uncorrected and corrected light intensities measured by the polarization camera 127 from the subject fluorescent sample filled in the five channels of the microchannel cell. The vertical axis represents the standard deviation among the five channels.

FIG. 34 provides dispersion (σ/MEAN) of the uncorrected and corrected light intensities measured by the polarization camera 127 from the subject fluorescent sample filled in the five channels of the microchannel cell. The vertical axis represents the dispersion (σ/ MEAN) of light intensities among the five channels. Comparing the dispersion before and after the correction in FIG. 34, the differences (variations) in corrected light intensity among the channels are smaller. The light intensities measured from the subject fluorescent sample should be uniform in the plane. FIGS. 32 to 34 teach that more accurate measurement on a subject fluorescent sample is achieved with the correction based on the light intensities measured from the reference fluorescent sample.

Embodiment 4

Device Configuration

Figure 35:
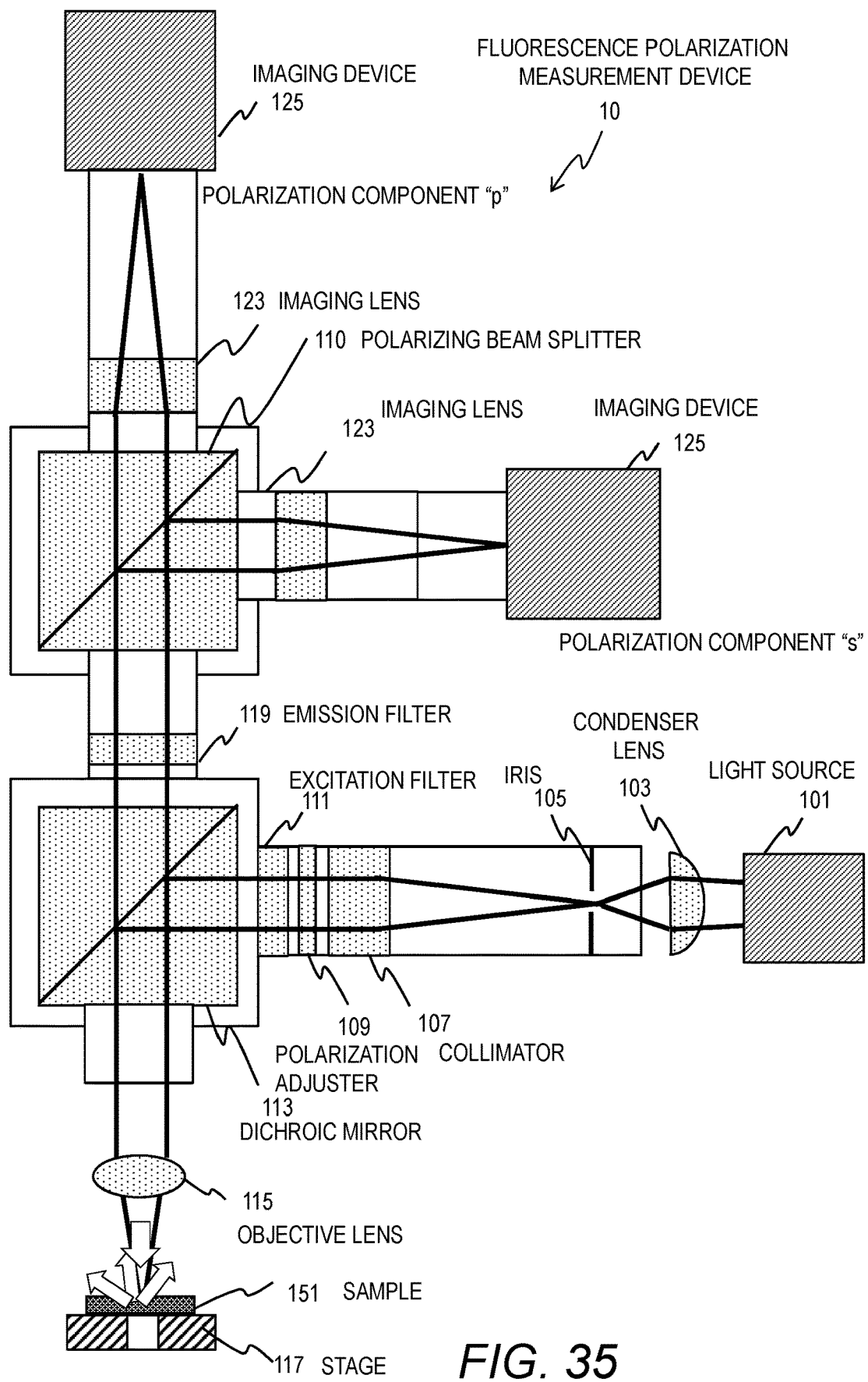
FIG. 35 schematically illustrates still another configuration example of a fluorescence polarization measurement device.

A measurement method using a fluorescence polarization measurement device having still another configuration is described. Differences from Embodiment 1 are mainly described. The fluorescence polarization measurement device is configured as illustrated in FIG. 35. The differences from the configuration in Embodiment 1 in FIG. 1 are the following two points: (1) the polarization adjuster on the emission side in Embodiment 4 is not a polarizing plate or a liquid crystal cell but a polarizing beam splitter 110 and (2) the device includes two imaging devices 125.

The polarizing beam splitter 110 transmits a specific linear polarization component (p) of the fluorescence and reflects a component (the direction of the polarizing beam splitter 110: s) orthogonal to the foregoing polarization component (the direction of the polarizing beam splitter 110: p). Specifically, the polarizing beam splitter 110 transmits p-linearly polarized light that is polarized in parallel to the polarization direction of the excitation light and reflects s-linearly polarized light that is polarized perpendicularly to the polarization direction of the excitation light.

Operation

Figure 36:
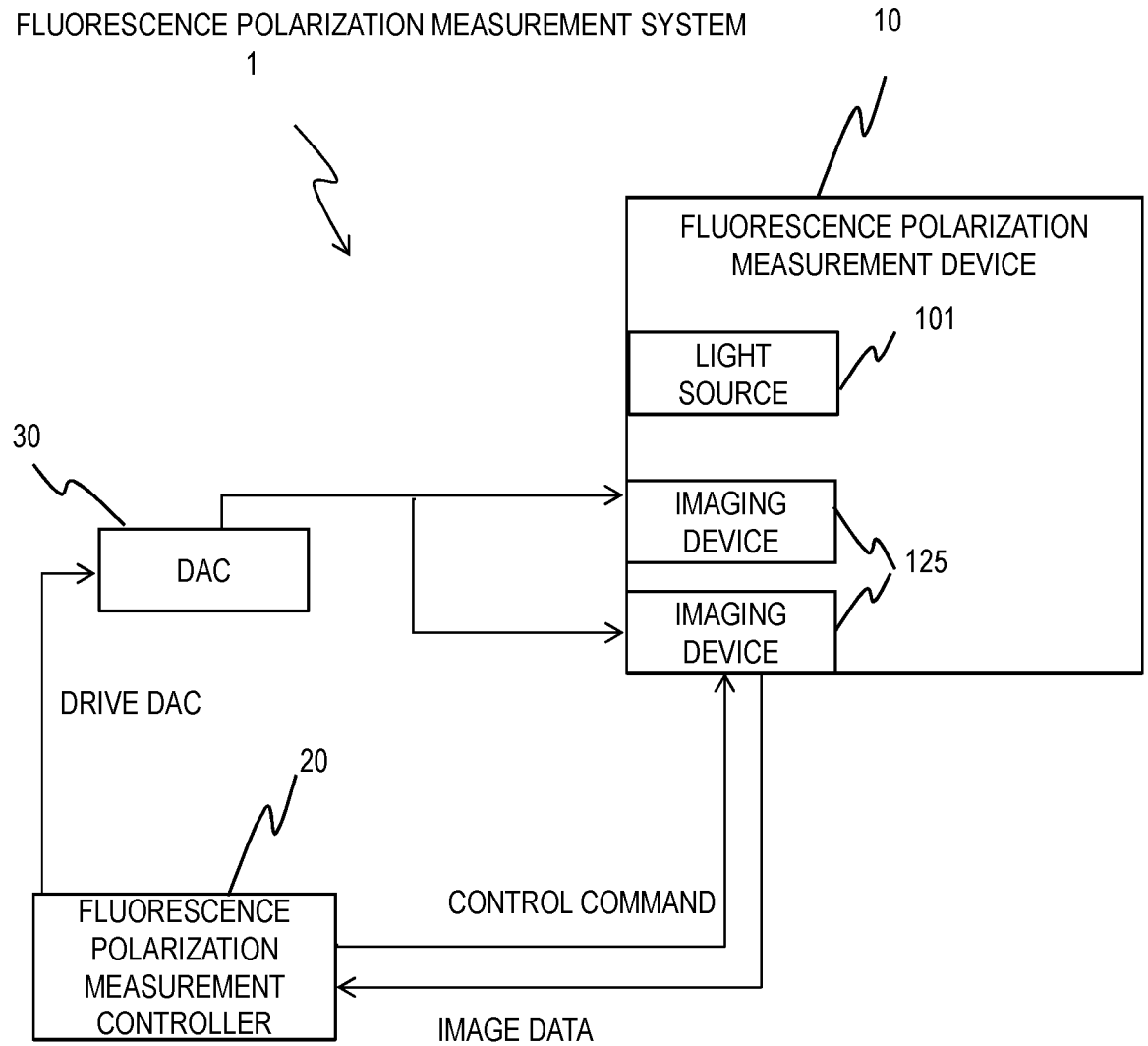
FIG. 36 schematically illustrates an example of a logical configuration of a fluorescence polarization measurement system in Embodiment 4.

Hereinafter, operation of the fluorescence polarization measurement controller 20 is described. As illustrated in FIG. 36, the fluorescence polarization measurement system 1 includes a fluorescence polarization measurement device 10, a fluorescence polarization measurement controller 20, and a D/A converter (DAC) 30. The fluorescence polarization measurement device is configured as described with reference to FIG. 36. The fluorescence polarization measurement controller 20 controls the fluorescence polarization measurement device 10 and analyzes the fluorescent images taken by the fluorescence polarization measurement device 10.

Specifically, the fluorescence polarization measurement controller 20 controls the light source 101 and the two imaging devices 125 of the fluorescence polarization measurement device 10. In the example described in the following, the polarization adjuster on the emission side is a polarizing beam splitter 110 to enable the imaging devices 125 to capture the images of light polarized in the directions p and s. The image of the light polarized in the direction p is a fluorescence polarization image of the linear polarization component that is parallel to the linearly polarized light incident on the sample. The image of the light polarized in the direction s is a fluorescence polarization image of the linear polarization component that is perpendicular to the linearly polarized light incident on the sample. The conditions of the polarization in the directions of p and s can be opposite, compared to this example. The remaining operation is the same as described in Embodiment 1. Differences from Embodiment 1 are mainly described.

For example, the fluorescence polarization measurement controller 20 keeps the light source 101 ON to illuminate the sample with excitation light during the measurement. The fluorescence polarization measurement controller 20 further controls the exposure times (imaging times), or the start times and the durations of imaging, of the two imaging devices 125 with the D/A converter 30 to acquire image data of the desired polarization components of the fluorescence. The fluorescence polarization measurement controller 20 analyzes the acquired image data. The fluorescence polarization measurement controller 20 corrects the values measured from the subject sample based on the image of a reference sample. This operation corrects the image altered by the device configuration of the fluorescence polarization measurement device 10 to achieve more accurate measurement.

For example, the fluorescence polarization measurement controller 20 controls the exposure times (imaging times), or the start times and the durations of imaging, of the imaging devices 125 with the processor to measure the polarization components of the two directions out of the fluorescence from the subject fluorescent sample for the equal measurement (exposure) periods. Further, the fluorescence polarization measurement controller 20 controls the imaging devices 125 to measure the polarization components of the two directions out of the fluorescence from the reference fluorescent sample for the measurement (exposure) periods equal to the measurement periods for the subject fluorescent sample. This configuration eliminates the difference among images caused by temporal change, achieving accurate measurement.

Measurement Method

Embodiment 4 is configured to acquire subject fluorescent-sample images and reference fluorescent-sample images by separately capturing the linear polarization components parallel and perpendicular to the linear polarization direction of the excitation light, like Embodiment 1.

Figure 37:
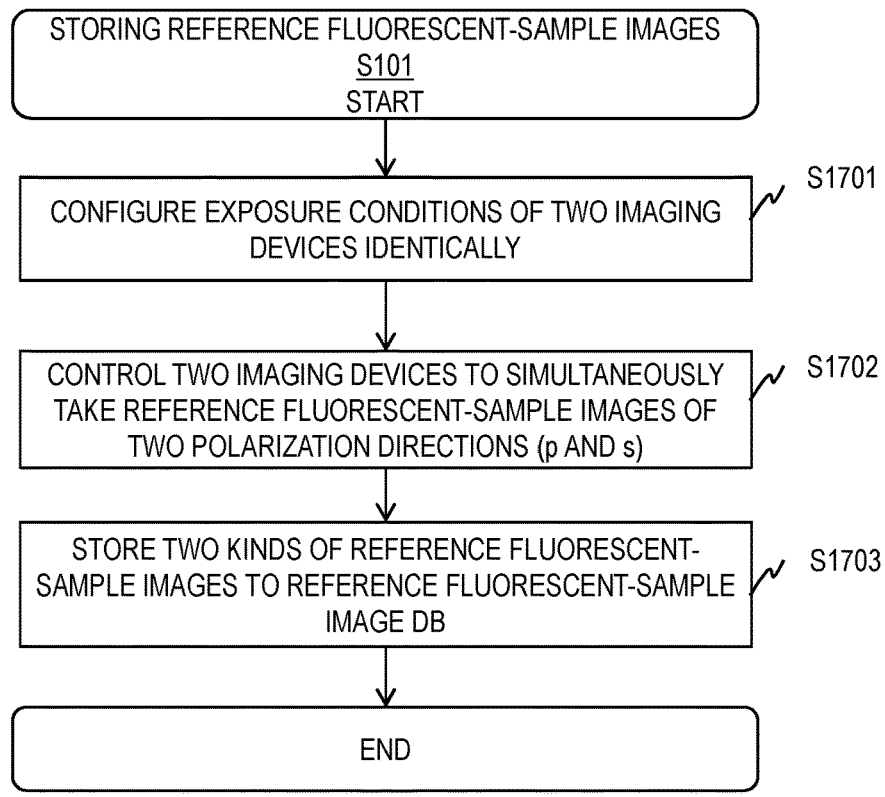
FIG. 37 is a flowchart of an example of the details of the step of storing reference fluorescent-sample images in Embodiment 4.

The general process of the measurement is the same as the method in Embodiment 1 illustrated in the flowchart of FIG. 4. Differences from Embodiment 1 are mainly described. FIG. 37 is a flowchart of an example of the details of the step S101 of storing reference fluorescent-sample images. The device control program 221 configures the exposure conditions of the two imaging devices 125 identically (S1701). The device control program 221 synchronously drives the two imaging devices 125 to simultaneously take reference fluorescent-sample images of the fluorescence signals in the two polarization directions p and s coming from the polarizing beam splitter (S1702). The image of the polarization direction p is a reference fluorescent-sample image obtained by capturing the polarization component parallel to the linear polarization direction of the excitation light and the image of the polarization direction s is a second reference fluorescent-sample image obtained by capturing the polarization component perpendicular to the linear polarization direction of the excitation light. The device control program 221 stores the acquired images to the reference fluorescent-sample image database 231 (S1703).

Figure 38:
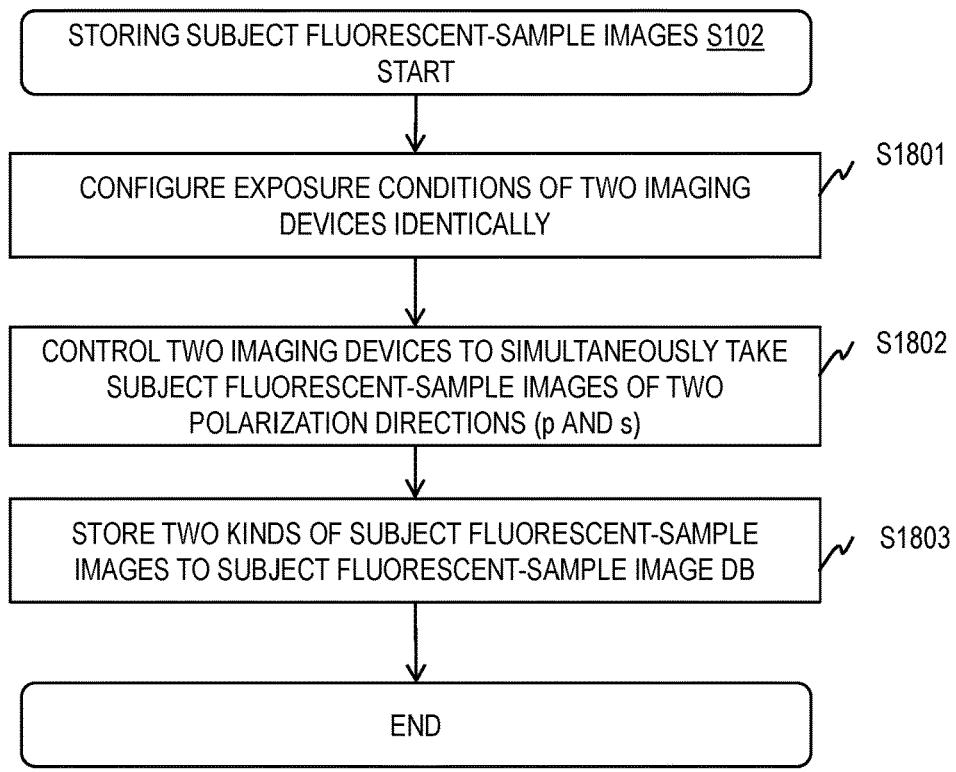
FIG. 38 is a flowchart of an example of the details of the step of storing subject fluorescent-sample images in Embodiment 4.

FIG. 38 is a flowchart of an example of the details of the step S102 of storing subject fluorescent-sample images. The device control program 221 configures the exposure conditions of the two imaging devices 125 identically (S1801). The device control program 221 synchronously drives the two imaging devices 125 to simultaneously take subject fluorescent-sample images of the fluorescence signals in the two polarization directions p and s coming from the polarizing beam splitter (S1802). The image of the polarization direction p is a subject fluorescent-sample image obtained by capturing the polarization component parallel to the linear polarization direction of the excitation light and the image of the polarization direction s is a subject fluorescent-sample image obtained by capturing the polarization component perpendicular to the linear polarization direction of the excitation light. The device control program 221 stores the acquired images to the subject fluorescent-sample image database 232 (S1803).

The fluorescent image analysis program 222 calculates the correction coefficients (first correction coefficients and second correction coefficients) for the first and the second subject fluorescent-sample images in accordance with the flowchart of FIG. 8, like in Embodiment 1.

The fluorescent image analysis program 222 corrects the light intensities of individual pixels (i,j) in each of the subject fluorescent-sample images using the obtained correction coefficients. As described in Embodiment 1, background correction coefficients can be used together.

This Embodiment 4 can also be configured to exclude the x-y coordinates of the fixed-pattern noise pixels and calculate the light intensities of the subject fluorescent sample and the reference fluorescent sample with the remaining pixels, as described in Embodiment 1.

Examples of Measurement Results

Hereinafter, examples of measurement results obtained from fluorescent samples with the imaging devices described in Embodiment 4 are described. Described in the following are the examples about the images of the linear polarization component parallel to the linear polarization direction of the excitation light acquired when the polarization direction of the polarizing beam splitter 110 is p. The subject fluorescent sample was a liquid material (fluorescently labeled solution) contained in a vessel. The reference fluorescent sample was a YAG ceramic piece.

Figure 39:
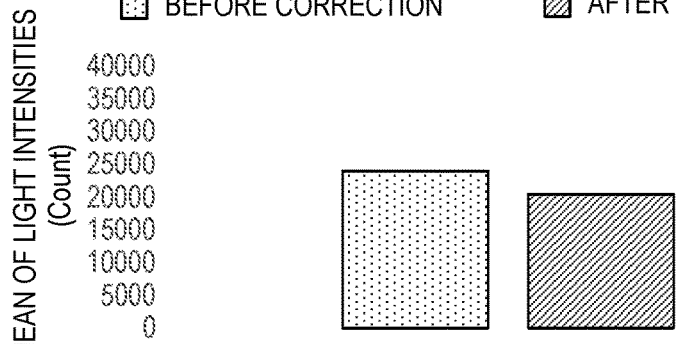
FIG. 39 provides mean values of uncorrected and corrected light intensities measured from a subject fluorescent sample filled in nine channels of a microchannel cell in Embodiment 4.
Figure 40:
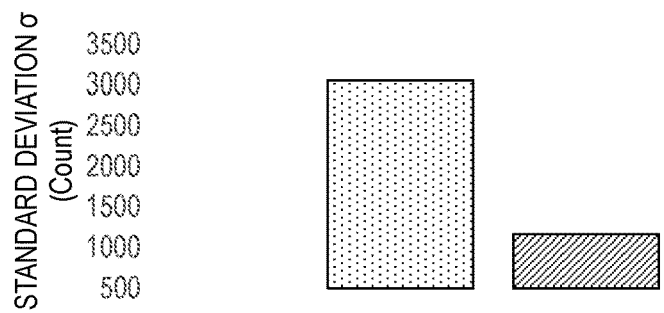
FIG. 40 provides standard deviations ($\sigma$) of the uncorrected and corrected light intensities measured from the subject fluorescent sample filled in the nine channels of the microchannel cell in Embodiment 4.

FIG. 39 provides mean values of uncorrected and corrected light intensities measured from a subject fluorescent sample filled in nine channels of a microchannel cell. The subject fluorescent sample filled in the nine channels were in the same concentration level and the polarization direction of the polarizing beam splitter was p to take an image of the light polarized in the direction parallel to the linear polarization direction of the excitation light. The measured light intensities were corrected based on the light intensities measured from the reference fluorescent sample. The vertical axis represents the mean light intensity among the nine channels. FIG. 40 provides standard deviations ($\sigma$) of the uncorrected and corrected light intensities measured from the subject fluorescent sample filled in the nine channels of the microchannel cell. The vertical axis represents the standard deviation among the nine channels.

Figure 41:
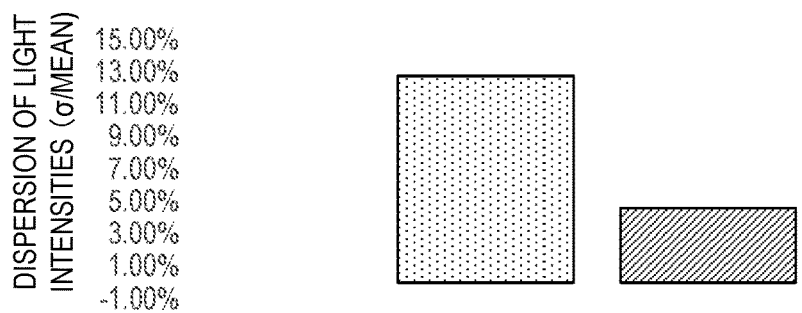
FIG. 41 provides dispersion ($\sigma$/MEAN) of uncorrected and corrected light intensities measured from the subject fluorescent sample filled in the nine channels of the microchannel cell in Embodiment 4.

FIG. 41 provides dispersion ($\sigma$/MEAN) of uncorrected and corrected light intensities measured from the subject fluorescent sample filled in the nine channels of the microchannel cell. The vertical axis represents the dispersion ($\sigma$/MEAN) of light intensities among the nine channels. Comparing the dispersion before and after the correction in FIG. 41, the differences (variations) in corrected light intensity among the channels are smaller. The light intensities measured from the subject fluorescent sample should be uniform in the plane. FIGS. 39 to 41 teach that more accurate measurement on a subject fluorescent sample is achieved with the correction based on the light intensities measured from the reference fluorescent sample. Regarding the other polarization direction s of the polarizing beam splitter, the correction exhibited the same effects.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A fluorescence polarization measurement system comprising:
a fluorescent image analyzer;
a light source;
a dichroic mirror;
a first polarization adjuster between the light source and the dichroic mirror;
an image sensor; and
a second polarization adjuster that is located between the image sensor and the dichroic mirror, and is configured to be switched between ON and OFF to transmit a linear polarization component parallel or perpendicular to linearly polarized light transmitted through the first polarization adjuster,
wherein the fluorescent image analyzer is structured to obtain a first reference fluorescent-sample image, a second reference fluorescent-sample image, a first subject fluorescent-sample image and a second subject fluorescent-sample image captured by the image sensor using the dichroic mirror,
wherein the first reference fluorescent-sample image is an image obtained by illuminating a reference fluorescent sample, about which relation of in-plane fluorescence intensities is known, with linearly polarized light transmitted through the first polarization adjuster from the light source and capturing a polarization component perpendicular to the linearly polarized light of fluorescence from the reference fluorescent sample,
wherein the second reference fluorescent-sample image is an image obtained by illuminating the reference fluorescent sample with linearly polarized light transmitted through the first polarization adjuster from the light source and capturing a polarization component parallel to the linearly polarized light of fluorescence from the reference fluorescent sample,
wherein the first subject fluorescent-sample image is an image obtained by illuminating a subject fluorescent sample with linearly polarized light transmitted through the first polarization adjuster from the light source and capturing the polarization component perpendicular to the linearly polarized light of fluorescence from the subject fluorescent sample,
wherein the second subject fluorescent-sample image is an image obtained by illuminating the subject fluorescent sample with linearly polarized light transmitted through the first polarization adjuster from the light source and capturing the polarization component parallel to the linearly polarized light of fluorescence from the subject fluorescent sample, and
wherein the fluorescent image analyzer is structured to:
determine a first correction coefficient to correct non-uniformity in measurement of light intensities among pixels of a captured image using the first reference fluorescent-sample image;
determine a second correction coefficient to correct non-uniformity in measurement of light intensities among pixels of a captured image using the second reference fluorescent-sample image;
correct light intensities of the pixels of the first subject fluorescent-sample image using the first correction coefficient; and
correct light intensities of the pixels of the second subject fluorescent-sample image using the second correction coefficient.

2. The fluorescence polarization measurement system according to claim 1, wherein the in-plane intensity of fluorescence from the reference fluorescent sample is uniform.

3. The fluorescence polarization measurement system according to claim 1, wherein the fluorescent image analyzer is structured to correct light intensities of the pixels of the first and second subject fluorescent-sample images using background correction coefficients.

4. The fluorescence polarization measurement system according to claim 1, wherein the fluorescent image analyzer is structured to:
determine background light intensities in a region other than a region of the subject fluorescent sample in the first and second subject fluorescent-sample images; and
correct light intensities of the pixels of the first and second subject fluorescent-sample images using the background light intensities.

5. The fluorescence polarization measurement system according to claim 1, wherein the fluorescent image analyzer is structured to:
detect fixed-pattern noise of an image sensor from the pixels of the first and second reference fluorescent-sample images and the pixels of the first and second subject fluorescent-sample images using a predetermined threshold for image sensor noise;
exclude pixels having noise from the first and second reference fluorescent-sample images in determining the first and second correction coefficients; and
exclude pixels having noise from the first and second subject fluorescent-sample images in determining light intensities of the pixels of the first and second subject fluorescent-sample images.

6. The fluorescence polarization measurement system according to claim 1,
wherein the second polarization adjuster is a liquid crystal cell.

7. The fluorescence polarization measurement system according to claim 1, wherein the first correction coefficient a⊥(i,j) of a pixel (i,j) is calculated by a following formula:

$$a\perp(i,j)=(1/Ir\perp(i,j))* |Ir\perp(i,j)|,$$

where Ir⊥(i,j) represents light intensity at the pixel (i,j) in the first reference fluorescent-sample image, and |Ir⊥(i,j)| represents a mean value of light intensities of a plurality of pixels constituting a predetermined region including the pixel (i,j) in the first reference fluorescent-sample image, and
wherein the second correction coefficient a⊥(i,j) of a pixel (i,j) is calculated by a following formula:

$$a//(i,j)=(1/Ir//(i,j))* |Ir//(i,j)|,$$

where Ir//(i,j) represents light intensity at the pixel (i,j) in the second reference fluorescent-sample image, and |Ir//(i,j)| represents a mean value of light intensities of a plurality of pixels constituting a predetermined region including the pixel (i,j) in the second reference fluorescent-sample image.

8. The fluorescence polarization measurement system according to claim 1, wherein the reference fluorescent sample is a YAG ceramic piece.

9. A fluorescence polarization measurement system comprising:
- a fluorescent image analyzer;
- a light source;
- a dichroic mirror;
- a polarization adjuster between the light source and the dichroic mirror; and
- a polarization camera including an image sensor and a polarizing filter configured to transmit a polarization component parallel and perpendicular to linearly polarized light transmitted through the polarization adjuster, wherein the fluorescent image analyzer is structured to obtain a first reference fluorescent-sample image, a second reference fluorescent-sample image, a first subject fluorescent-sample image and a second subject fluorescent-sample image captured by the image sensor using the dichroic mirror, wherein the first reference fluorescent-sample image is an image obtained by illuminating a reference fluorescent sample, about which relation of in-plane fluorescence intensities is known, with linearly polarized light transmitted through the polarization adjuster from the light source and capturing a polarization component perpendicular to the linearly polarized light of fluorescence from the reference fluorescent sample, wherein the second reference fluorescent-sample image is an image obtained by illuminating the reference fluorescent sample with linearly polarized light transmitted through the polarization adjuster from the light source and capturing a polarization component parallel to the linearly polarized light of fluorescence from the reference fluorescent sample, wherein the first subject fluorescent-sample image is an image obtained by illuminating a subject fluorescent sample with linearly polarized light transmitted through the polarization adjuster from the light source and capturing the polarization component perpendicular to the linearly polarized light of fluorescence from the subject fluorescent sample, wherein the second subject fluorescent-sample image is an image obtained by illuminating the subject fluorescent sample with linearly polarized light transmitted through the polarization adjuster from the light source and capturing the polarization component parallel to the linearly polarized light of fluorescence from the subject fluorescent sample, and wherein the fluorescent image analyzer is structured to:
- determine a first correction coefficient to correct non-uniformity in measurement of light intensities among pixels of a captured image using the first reference fluorescent-sample image;
- determine a second correction coefficient to correct non-uniformity in measurement of light intensities among pixels of a captured image using the second reference fluorescent-sample image;
- correct light intensities of the pixels of the first subject fluorescent-sample image using the first correction coefficient, and
- correct light intensities of the pixels of the second subject fluorescent-sample image using the second correction coefficient.

10. The fluorescence polarization measurement system according to claim 9, wherein the first correction coefficient $a\perp(i,j)$ of a pixel $(i,j)$ is calculated by a following formula:

$$a\perp(i,j) = (1/Ir\perp(i,j)) * |Ir\perp(i,j)|,$$

where $Ir\perp(i,j)$ represents light intensity at the pixel $(i,j)$ in the first reference fluorescent-sample image, and $|Ir\perp(i,j)|$ represents a mean value of light intensities of a plurality of pixels constituting a predetermined region including the pixel $(i,j)$ in the first reference fluorescent-sample image, and wherein the second correction coefficient $a\perp(i,j)$ of a pixel $(i,j)$ is calculated by a following formula:

$$a//(i,j) = (1/Ir//(i,j)) * |Ir//(i,j)|,$$

where $Ir//(i,j)$ represents light intensity at the pixel $(i,j)$ in the second reference fluorescent-sample image, and $|Ir//(i,j)|$ represents a mean value of light intensities of a plurality of pixels constituting a predetermined region including the pixel $(i,j)$ in the second reference fluorescent-sample image.

11. The fluorescence polarization measurement system according to claim 9, wherein the in-plane intensity of fluorescence from the reference fluorescent sample is uniform.

12. The fluorescence polarization measurement system according to claim 9, wherein the fluorescent image analyzer is structured to correct light intensities of the pixels of the first and second subject fluorescent-sample images using background correction coefficients.

13. The fluorescence polarization measurement system according to claim 9, wherein the fluorescent image analyzer is structured to:
- determine background light intensities in a region other than a region of the subject fluorescent sample in the first and second subject fluorescent-sample images; and
- correct light intensities of the pixels of the first and second subject fluorescent-sample images using the background light intensities.

14. The fluorescence polarization measurement system according to claim 9, wherein the fluorescent image analyzer is structured to:
- detect fixed-pattern noise of an image sensor from the pixels of the first and second reference fluorescent-sample images and the pixels of the first and second subject fluorescent-sample images using a predetermined threshold for image sensor noise;
- exclude pixels having noise from the first and second reference fluorescent-sample images in determining the first and second correction coefficients; and
- exclude pixels having noise from the first and second subject fluorescent-sample images in determining light intensities of the pixels of the first and second subject fluorescent-sample images.

15. The fluorescence polarization measurement system according to claim 9, wherein the reference fluorescent sample is a YAG ceramic piece.

16. A fluorescence polarization measurement system comprising: a fluorescent image analyzer; a light source; a dichroic mirror; a first polarization adjuster between the light source and the dichroic mirror; an image sensor; and a second polarization adjuster that is located between the image sensor and the dichroic mirror, and cyclically changes intensity of a first predetermined polarization component of light transmitted through the second polarization adjuster, wherein the fluorescent image analyzer is structured to obtain a reference fluorescent-sample image and a subject fluorescent-sample image captured by the image sensor using the dichroic mirror, wherein the reference fluorescent-sample image is an image obtained by illuminating a reference fluorescent sample, about which relation of in-plane fluorescence intensities is known, with linearly polarized light transmitted through the polarization adjuster from the light source and capturing the first predetermined polarization component of fluorescence from the reference fluorescent sample, wherein the subject fluorescent-sample image is an image obtained by illuminating a subject fluorescent sample with linearly polarized light and capturing the first predetermined polarization component of fluorescence from the subject fluorescent sample, and wherein the fluorescent image analyzer is structured to: determine a correction coefficient to correct non-uniformity in measurement of light intensities among pixels of a captured image using the reference fluorescent-sample image; correct light intensities of the pixels of the subject fluorescent-sample image using the correction coefficient; and calculate a polarization value P using the following formula:

$P = (\pi/4 \sqrt{2}) * (B/A)$ $A = (LD1 + LD2 + LD3 + LD4)$ $B = \sqrt{(LD1-LD3)^2 + (LD2-LD4)^2}$ where LD1 to LD4 are light intensities transmitted through the second polarization adjuster and corrected with the correction coefficient in consecutive four periods in an ROI a region of interest-ROI-in the subject fluorescent-sample image.

17. The fluorescence polarization measurement system according to claim 16, wherein the in-plane intensity of fluorescence from the reference fluorescent sample is uniform.

18. The fluorescence polarization measurement system according to claim 16, wherein the fluorescent image analyzer is structured to correct light intensities of the pixels of the subject fluorescent-sample image using background correction coefficients.

19. The fluorescence polarization measurement system according to claim 16, wherein the fluorescent image analyzer is structured to:
  determine background light intensities in a region other than a region of the subject fluorescent sample in the subject fluorescent-sample image; and
  correct light intensities of the pixels of the subject fluorescent-sample image using the background light intensities.

20. The fluorescence polarization measurement system according to claim 16, wherein the reference fluorescent sample is a YAG ceramic piece.

* * * * *